(12) United States Patent
Giancristofaro et al.

(10) Patent No.: US 11,762,081 B2
(45) Date of Patent: Sep. 19, 2023

(54) LOCATOR SYSTEM AND RELATED LOCALIZATION METHOD AND SERVICE WITH INNOVATIVE TIME AND FREQUENCY SINCHRONIZATION OF LOCALIZATOR TRANSPONDERS

(71) Applicant: Thales Alenia Space Italia S.p.A. Con Unico Socio, Rome (IT)

(72) Inventors: Domenico Giancristofaro, Rome (IT); Gianluca Chiarelli, Rome (IT)

(73) Assignee: Thales Alenia Space Italia S.p.A. Con Unico Socio, Rome (IT)

(*) Notice: Subject to any disclaimer, the term of this patent is extended or adjusted under 35 U.S.C. 154(b) by 296 days.

(21) Appl. No.: 17/292,761

(22) PCT Filed: Nov. 12, 2019

(86) PCT No.: PCT/IB2019/059711
§ 371 (c)(1),
(2) Date: May 11, 2021

(87) PCT Pub. No.: WO2020/100035
PCT Pub. Date: May 22, 2020

(65) Prior Publication Data
US 2021/0396866 A1 Dec. 23, 2021

(30) Foreign Application Priority Data
Nov. 12, 2018 (IT) .......................... 102018000010252

(51) Int. Cl.
*G01S 13/82* (2006.01)
*G01S 13/90* (2006.01)
*G01S 7/40* (2006.01)

(52) U.S. Cl.
CPC .......... *G01S 13/825* (2013.01); *G01S 7/4017* (2013.01); *G01S 13/90* (2013.01); *G01S 13/9064* (2019.05)

(58) Field of Classification Search
CPC ...... G01S 13/825; G01S 7/4017; G01S 13/90; G01S 13/9064
See application file for complete search history.

(56) References Cited

U.S. PATENT DOCUMENTS

2010/0013700 A1* 1/2010 Chiassarini ............. G01S 13/90
342/25 F
2015/0033109 A1 11/2015 Haoyun et al.

FOREIGN PATENT DOCUMENTS

WO WO 2018/162756 A1 9/2018

OTHER PUBLICATIONS

PCT International Search Report and Written Opinion dated Jan. 22, 2020 for PCT/IB2019/059711.

* cited by examiner

*Primary Examiner* — Timothy A Brainard
*Assistant Examiner* — Helena H Seraydaryan
(74) *Attorney, Agent, or Firm* — McCarter & English, LLP

(57) ABSTRACT

A localization method for locating a target that is coupled with a locator transponder associated with a permanent identification code permanently assigned to the locator transponder is provided. The localization method includes: a) transmitting a spread spectrum paging signal carrying the permanent identification code and a shorter temporary identification code temporarily assigned to the locator transponder; b) receiving the spread spectrum paging signal and extracting the temporary identification code carried by the received spread spectrum paging signal; c) transmitting radar signals towards area(s) of earth's surface or sky and receiving echo signals therefrom; d) upon reception by the locator transponder of radar signal(s), generating and transmitting a sequence of watermarked radar echo signals in which a spread spectrum watermarking signal is embedded that includes the temporary identification code; e) carrying out localization operations; f) transmitting frequency-synchronization-aid signal(s); g) receiving the frequency-synchronization-aid signal(s) and estimating a frequency drift affecting a reference frequency provided by a local oscillator of the locator transponder; wherein the locator transponder transmits the sequence of watermarked radar echo signals by using a transmission carrier frequency obtained based on the reference frequency provided by the local oscillator and on the estimated frequency drift.

8 Claims, 18 Drawing Sheets

LOCATOR SYSTEM AND RELATED LOCALIZATION METHOD AND SERVICE WITH INNOVATIVE TIME AND FREQUENCY SINCHRONIZATION OF LOCALIZATOR TRANSPONDERS

CROSS-REFERENCE TO RELATED APPLICATIONS

This patent application is a 35 U.S.C. § 371 National Stage filing of International Application No. PCT/IB2019/059711, filed on Nov. 12, 2019, which application claims priority from Italian patent application no. 102018000010252 filed on Nov. 12, 2018, the entire disclosure of which are incorporated herein by reference.

TECHNICAL FIELD OF THE INVENTION

The present invention relates to a locator system and related localization method and service with innovative time and frequency synchronization of locator transponders.

More specifically, the present invention advantageously exploits for localization purposes:
- a radar-based system that may conveniently be
  - a Synthetic Aperture Radar (SAR) system (such as a SAR system employing one or more SAR sensors carried on satellite(s) and/or aircraft(s) and/or drone(s) and/or helicopter(s), etc.),
  - an Inverse Synthetic Aperture Radar (ISAR) system (such as an ISAR system employing one or more radar sensors carried on satellite(s) and/or aircraft(s) and/or drone(s) and/or helicopter(s), etc.),
  - or even a generic radar system (such as a ground-based, naval/maritime, airborne or satellite radar system—e.g., a detection and search radar, an Air Traffic Control (ATC) radar, a weather radar, etc.);
- a radio communications system that may conveniently be distinct from the radar-based system or integrated therewith (for example, one or more satellites/aircrafts/drones equipped, each, with both a SAR/radar sensor and a radio communications system/device/equipment/apparatus could be advantageously exploited); and
- a small-sized, light, low-cost, low power consumption, regenerative locator transponder.

STATE OF THE ART

WO 2018/162756 A1 relates to a locator system employing a low power consumption, regenerative transponder, and to localization method and service implemented/provided by said locator system.

In particular, WO 2018/162756 A1 discloses a localization method for locating a target that is coupled with a locator transponder associated with a permanent identification code permanently assigned to said locator transponder. Said localization method comprises:

a) upon reception of a user request for locating the target, transmitting, by a paging system or a radar-based system, a spread spectrum paging signal carrying the permanent identification code and a temporary identification code temporarily assigned to the locator transponder, wherein said temporary identification code is shorter than said permanent identification code;

b) receiving, by the locator transponder, the spread spectrum paging signal and extracting, by said locator transponder, the temporary identification code carried by said spread spectrum paging signal received;

c) transmitting, by the radar-based system, radar signals towards one or more areas of earth's surface or sky, and receiving, by said radar-based system, echo signals from said one or more areas of the earth's surface or of the sky;

d) upon reception by the locator transponder of one or more radar signals transmitted by the radar-based system, generating and transmitting, by said locator transponder, a sequence of watermarked radar echo signals in which a spread spectrum watermarking signal is embedded, wherein said spread spectrum watermarking signal carries the temporary identification code extracted.

More in detail, generating and transmitting, by the locator transponder, the sequence of watermarked radar echo signals includes:
- generating a sequence of radar echo signals on the basis of the radar signal(s) received;
- modulating the generated sequence of radar echo signals on the basis of the spread spectrum watermarking signal, thereby obtaining the sequence of watermarked radar echo signals; and
- transmitting said sequence of watermarked radar echo signals.

The spread spectrum watermarking signal includes a synchronization portion and an information portion. The synchronization portion of the spread spectrum watermarking signal is generated on the basis of a first predefined pseudo noise code. The information portion of the spread spectrum watermarking signal is generated by applying a first predefined spread spectrum technique to a given signal carrying the temporary identification code extracted. Said first predefined spread spectrum technique is applied by using a second predefined pseudo noise code, that is the same as, or different than, the first predefined pseudo noise code.

Moreover, the localization method according to WO 2018/162756 A1 further comprises:

e) carrying out, by the radar-based system, localization operations that include
- detecting, in the received echo signals, the sequence of watermarked radar echo signals transmitted by the locator transponder by detecting the synchronization portion of the spread spectrum watermarking signal embedded in said sequence of watermarked radar echo signals,
- extracting the temporary identification code carried by the spread spectrum watermarking signal embedded in the sequence of watermarked radar echo signals detected by extracting said temporary identification code from the information portion of the spread spectrum watermarking signal embedded in said sequence of watermarked radar echo signals detected, and
- determining a location of the locator transponder on the basis of the sequence of watermarked radar echo signals detected.

Conveniently, the spread spectrum paging signal includes a first portion followed by a second portion, wherein:
- the first portion of the spread spectrum paging signal is generated by applying a second predefined spread spectrum technique to the permanent identification code;
- said second predefined spread spectrum technique is applied by using a third predefined pseudo noise code;
- the second portion of the spread spectrum paging signal is generated by applying a third predefined spread spectrum technique to the temporary identification code, said third predefined spread spectrum technique being the same as, or different than, the second predefined spread spectrum technique; and said third predefined spread spectrum technique is applied by using a fourth predefined pseudo noise code, that is the same as, or different than, the third predefined pseudo noise code.

The spread spectrum paging signal may conveniently carry also redundancy bits of an Error Detection And Correction (EDAC) code.

Conveniently, modulating the generated sequence of radar echo signals includes phase modulating said generated sequence of radar echo signals on the basis of the spread spectrum watermarking signal.

Preferably, the given signal carrying the extracted temporary identification code includes a temporary-identification-code-related portion followed by an error detection portion, wherein said temporary-identification-code-related portion carries the temporary identification code and said error detection portion carries an error detection code computed on the basis of the temporary identification code.

More preferably, the temporary identification code is encoded in the temporary-identification-code-related portion of the given signal by using an error correction technique.

Conveniently, the radar-based system is a radar system or a SAR system or an ISAR system.

More conveniently, the localization operations carried out by the radar-based system further include forming a radar/SAR/ISAR image on the basis of the received echo signals; moreover, determining a location of the locator transponder includes determining a location of the locator transponder in the formed radar/SAR/ISAR image on the basis of the sequence of watermarked radar echo signals detected.

In particular, forming a radar/SAR/ISAR image on the basis of the received echo signals conveniently includes:

removing, from the received echo signals, the sequence of watermarked radar echo signals detected, thereby obtaining watermark-free echo signals; and forming a watermark-free radar/SAR/ISAR image on the basis of the watermark-free echo signals.

In detail, the sequence of watermarked radar echo signals detected may be conveniently removed from the received echo signals by using a multiuser detection technique.

Conveniently, the paging system may be a communications satellite system/network, or the radar-based system itself, or an ad hoc paging system that is specifically designed and dedicated to locator transponder activation and that is integrated into the radar-based system or distinct therefrom.

WO 2018/162756 A1 discloses also a locator system specifically designed and configured to carry out the above localization method, and to a locator transponder specifically designed and configured to carry out the steps b) and d) of said localization method.

Said locator transponder is conveniently configured to operate in:

an idle mode in which only first means of said locator transponder are on, said first means being configured to receive spread spectrum paging signals, and checking whether a received spread spectrum paging signal carries the permanent identification code associated with said locator transponder; and a localization mode in which also second means of said locator transponder are on, said second means being configured to extract the temporary identification code carried by a received spread spectrum paging signal carrying the permanent identification code associated with said locator transponder, and carry out the step d) of said localization method.

Moreover, the locator transponder is preferably configured to switch from the idle mode to the localization mode when the first means detect a received spread spectrum paging signal carrying the permanent identification code associated with said locator transponder.

Conveniently, the locator transponder is further configured to switch from the localization mode to the idle mode after a predefined time of operation in the localization mode, and/or upon reception of a radiofrequency (RF) signal carrying a predefined command (such as an RF signal transmitted by the paging system or the radar-based system).

Conveniently, the locator transponder may be designed to carry out, in the idle mode, a power harvesting mechanism to collect/harvest power received from the radar/SAR/ISAR system(s) and, for example, to use the collected/harvested power for battery recharge and/or other additional functions.

For a better understanding of the locator system according to WO 2018/162756 A1, FIGS. 1, 2 and 3 schematically illustrate three examples of locator system disclosed in WO 2018/162756 A1.

In particular, FIG. 1 shows a first locator system (denoted as a whole by 1A) that is designed to provide an on demand localization service to locate a target (such as an object, a vehicle, a vessel, a person, an animal, etc.) upon request of a user interested in knowing target's location. In other words, the first locator system 1A is configured to, in response to a user request for locating a target, carry out the above localization method to determine the position of the target.

As shown in FIG. 1, the first locator system 1A includes a locator system control center 2, a communications satellite system or network 3, a SAR system 4 and a locator transponder 5.

The locator transponder 5 is coupled with a target (not shown in FIG. 1) to be located in response to a user request and is associated with a permanent identification code, that univocally and permanently identifies said locator transponder 5 and that is conveniently stored on an internal memory of said locator transponder 5.

The SAR system 4 comprises an airborne/satellite SAR 41 (i.e., a SAR sensor installed on board an aircraft/drone/UAV (i.e., Unmanned Aerial Vehicle) or a satellite) and a control and processing ground station 42, that are wirelessly and remotely connected to each other to allow transmission of control commands from the control and processing ground station 42 to the airborne/satellite SAR 41 and of telemetry and remotely sensed data from said airborne/satellite SAR 41 to said control and processing ground station 42.

The locator system control center 2 is connected to the communications satellite system/network 3 and to the control and processing ground station 42 of the SAR system 4.

Moreover, FIG. 2 shows a second locator system (denoted as a whole by 1B) according to WO 2018/162756 A1, which includes the locator system control center 2, a paging system 6, a radar system 7 and the locator transponder 5.

In the second locator system 1B, the locator system control center 2 is connected to the paging system 6 and to the radar system 7.

Furthermore, FIG. 3 shows a third locator system (denoted as a whole by 1C) according to WO 2018/162756 A1, which includes the locator system control center 2, the paging system 6, an ISAR system 8 and the locator transponder 5.

In the third locator system 1C, the locator system control center 2 is connected to the paging system 6 and to the ISAR system 8.

The second and third locator systems 1B and 1C are designed to provide the on demand localization service to locate targets (such as objects, vehicles, vessels, people, animals, etc.), upon request of users, within the coverage regions of the radar system 7 and the ISAR system 8, respectively.

The second and third locator systems 1B and 1C are designed to operate substantially in the same way, mutatis mutandis, as the first locator system 1A.

With respect to the first locator system 1A that, if based on a satellite SAR system, provides a global coverage, the second and third locator systems 1B and 1C, even if based on the use of multiple cooperating radars (e.g., a coastal distribution of radars), provide a more regional coverage.

In the second and third locator systems 1B and 1C, the paging system 6 is designed for locator transponder activation and may be a system distinct from the radar/ISAR system 7,8 or may be directly integrated into the radar/ISAR system 7,8 and may use RF front end thereof to transmit spread spectrum paging signals. Alternatively, the locator transponder activation may be performed directly by the radar/ISAR system 7,8 (for example by transmitting sequences of properly coded inverse chirps or signals with minimum cross-correlation with the radar/ISAR scanning signals/waveforms (i.e., those used for radar/ISAR detection/imaging)).

Additionally, FIG. 4 schematically illustrates the localization method performed, in use, by the first/second/third locator system 1A,1B,1C.

In particular, in response to a localization request (block 11 in FIG. 4) received from a user 9 (for example, via a website of the first/second/third locator system 1A,1B,1C), the locator system control center 2 activates a search for the locator transponder 5 (block 12 in FIG. 4) by:
  assigning a temporary identification code to said locator transponder 5, wherein said temporary identification code is shorter than the permanent identification code; and
  sending a first search activation message to the communications satellite system/network 3/the paging system 6 and a second search activation message to the SAR/radar/ISAR system 4,7,8 (e.g., to the control and processing ground station 42 of the SAR system 4), wherein the first search activation message includes both the permanent and temporary identification codes of the locator transponder 5 to be located, while the second search activation message includes only the temporary identification code.

Conveniently, the permanent and temporary identification codes are, respectively, M-digit and N-digit numbers (for example, M-digit and N-digit binary, hexadecimal or decimal numbers), wherein M and N are positive integers with N smaller than M.

In particular, permanent identification code length is conveniently sized to allow allocation of an univocal permanent identification code to each locator transponder 5 belonging to the first/second/third locator system 1A,1B,1C (namely, the permanent identification codes are conveniently long enough to "cover" the whole "population" of locator transponders 5 of the first/second/third locator system 1A,1B,1C). Instead, temporary identification code length is conveniently sized to allow allocation of an univocal temporary identification code to each locator transponder 5 to be located at a given time; therefore, on the assumption that only few (i.e., a limited number of) locator transponders 5 are to be located at the same time, the temporary identification code length can be extremely smaller than the permanent identification code length (e.g., a 3-bit temporary identification code is sufficient to locate up to eight locator transponders 5 at the same time). Anyway, if necessary, the temporary identification code may be conveniently concatenated in length so as to allow localization of a wider community of locator transponders 5 at the same time.

Again with reference to FIG. 4, the communications satellite system/network 3/the paging system 6, upon reception of the first search activation message, carries out a paging step (block 13 in FIG. 4), that includes transmitting a spread spectrum paging signal carrying the permanent and temporary identification codes of the locator transponder 5 to be located.

Conveniently, the spread spectrum paging signal transmitted by the communications satellite system/network 3/the paging system 6 is a very low data rate signal that, as in deep space communications, can endure an extremely poor link budget and exploit very slow receiving circuits thereby enabling very low power consumption by the locator transponder 5.

Preferably, the spread spectrum paging signal includes a first portion followed by a second portion, wherein:
  the first portion is
    intended to enable the locator transponder 5, at reception side, to detect the permanent identification code and synchronize with said spread spectrum paging signal, and
    generated by applying a first predefined spread spectrum technique (such as a direct-sequence spread spectrum (DSSS) technique) to the permanent identification code, wherein said first predefined spread spectrum technique is applied by using a first predefined Pseudo Noise (PN) code (such as a Barker code, a Gold code, a Kasami code, etc.); and
  the second portion is generated by applying a second predefined spread spectrum technique (such as a DSSS technique) to the temporary identification code, wherein said second predefined spread spectrum technique is applied by using a second predefined PN code (such as a Barker code, a Gold code, a Kasami code, etc.).

Conveniently, said first and second predefined spread spectrum techniques may be the same as, or different than, one another; moreover, said first and second predefined PN codes may be conveniently the same as, or different than, one another.

The locator transponder 5 is designed to operate in an idle mode and in a localization mode. In particular, the locator transponder 5 is configured to operate by default in the idle mode, in which said locator transponder 5 performs, at least periodically, only functions for spread spectrum paging signal receiving and processing to check presence of its permanent identification code in spread spectrum paging signals received. Therefore, in the idle mode only components/units/modules of said locator transponder 5 for spread spectrum paging signal receiving and processing are operated (at least periodically), while all other components/units/modules are off, thereby resulting in the locator transponder 5 having, in the idle mode, an extremely low power consumption. Conveniently, the locator transponder 5 may be designed to carry out, in the idle mode, a power harvesting mechanism to collect/harvest power received from the SAR/radar/ISAR system 4,7,8 and, for example, to use the collected/harvested power for battery recharge and/or other additional functions.

Again with reference to FIG. 4, the locator transponder 5, upon reception of a spread spectrum paging signal carrying its permanent identification code, awakes (block 14 in FIG. 4) and starts operating in the localization mode, in which said locator transponder 5 cooperates with the SAR/radar/ISAR system 4,7,8 to allow the latter to determine the position of said locator transponder 5.

In particular, upon reception of a spread spectrum paging signal carrying its permanent identification code, the locator transponder 5 extracts the temporary identification code carried by said spread spectrum paging signal received, which temporary identification code is then used to allow the SAR/radar/ISAR system 4,7,8 to determine the position of said locator transponder 5.

In fact, upon reception of the second search activation message, the SAR/radar/ISAR system 4,7,8 activates SAR/radar/ISAR localization (block 15 in FIG. 4) for locating the locator transponder 5 associated with the temporary identification code contained in the second search activation message received.

The SAR/radar/ISAR localization activation (block 15 in FIG. 4) does not affect normal operation in transmission and reception of the SAR/radar/ISAR system 4,7,8 (e.g., of the airborne/satellite SAR 41). In fact, after the SAR/radar/ISAR localization activation (block 15 in FIG. 5), the SAR/radar/ISAR system 4,7,8 continues operating according to its predefined operating mode (e.g., the airborne/satellite SAR 41 continues operating in Stripmap mode, Spotlight mode, etc.) by transmitting radar signals towards, and receiving echo signals from, one or more target areas of the earth's surface or of the sky. Instead, as it will be described in the following, after the SAR localization activation (block 15 in FIG. 4), the SAR/radar/ISAR system 4,7,8 (e.g., the control and processing ground station 42) starts carrying out a specific processing (block 17 in FIG. 4) of the echo signals received, by handling the localization of the locator transponder 5 differently from the traditional SAR/radar/ISAR processing.

Upon reception of one or more radar signals transmitted by the SAR/radar/ISAR system 4,7,8 (e.g., by the airborne/satellite SAR 41), the locator transponder 5 (that is operating in the localization mode) performs a spread spectrum watermarking step (block 16 in FIG. 4), that includes generating and transmitting a sequence of watermarked radar echo signals in which a spread spectrum watermarking signal is embedded, wherein said spread spectrum watermarking signal carries the temporary identification code of said locator transponder 5 (in particular, the temporary identification code extracted by said locator transponder 5 from the spread spectrum paging signal received from the communications satellite system/network 3/the paging system 6). The sequence of watermarked radar echo signals may be conveniently generated and transmitted all together upon reception of a radar chirp, or in a fragmented way after each received radar chirp, depending on timing analyses typical of SAR/radar/ISAR, that take into account swath size, Pulse Repetition Frequency (PRF) and watermark sequence length. In the first case, the watermark energy, in multiple phase-coded chirps identical to the one received from the SAR/radar/ISAR system 4,7,8, is concentrated around each received chirp; in the second case, the watermark is fragmented around the epoch of reception of multiple chirps.

Preferably, generating and transmitting a sequence of watermarked radar echo signals includes:
   generating a sequence of radar echo signals on the basis of the one or more radar signals received by the locator transponder 5 from the SAR/radar/ISAR system 4,7,8 (e.g., from the airborne/satellite SAR 41);
   modulating (more preferably, frequency or phase modulating) the generated sequence of radar echo signals on the basis of the spread spectrum watermarking signal, thereby obtaining the sequence of watermarked radar echo signals; and
   transmitting said sequence of watermarked radar echo signals.

Preferably, the spread spectrum watermarking signal includes a synchronization portion and an information portion, wherein the synchronization portion is followed by the information portion or, alternatively, the synchronization and information portions are superimposed in time, and wherein:
   the synchronization portion is
      intended to enable the SAR/radar/ISAR system 4,7,8, at reception side, to detect, and synchronize with, said spread spectrum watermarking signal, and
      generated by the locator transponder 5 on the basis of a third predefined PN code (such as a Barker code, a Gold code, a Kasami code, etc.); and
   the information portion is generated by the locator transponder 5 by applying a third predefined spread spectrum technique (such as a DSSS technique) to a given signal carrying the temporary identification code, wherein said third predefined spread spectrum technique is applied by using a fourth predefined PN code (such as a Barker code, a Gold code, a Kasami code, etc.).

Conveniently, said third and fourth predefined PN codes may be the same as, or different than, one another.

In order to increase robustness of information decoding and of error detection and correction at reception side, the given signal may conveniently include a temporary-identification-code-related portion followed by an error detection portion, wherein:
   the temporary-identification-code-related portion carries the temporary identification code; and
   the error detection portion carries an error detection code (such as a Cyclic Redundancy Check (CRC) code or another type of integrity/parity check code) computed on the basis of the temporary identification code.

In order to further increase robustness of information decoding and of error detection and correction at reception side, the temporary identification code can be conveniently encoded in the temporary-identification-code-related portion of the given signal by using an error correction technique, conveniently a Forward Error Correction (FEC) technique, such as a FEC technique based on Reed-Muller codes or other types of error correction codes.

Again with reference to FIG. 4, the SAR/radar/ISAR system 4,7,8 (e.g, the control and processing ground station 42), when SAR/radar/ISAR localization has been activated (block 15 in FIG. 4), performs a localization step (block 17 in FIG. 4), that includes:
   detecting, in the echo signals received, the sequence of watermarked radar echo signals transmitted by the locator transponder 5;
   extracting, from the sequence of watermarked radar echo signals detected, the temporary identification code of the locator transponder 5;

forming a SAR/radar/ISAR image on the basis of the echo signals received;

determining a location of the locator transponder 5 in the formed SAR/radar/ISAR image on the basis of the sequence of watermarked radar echo signals detected;

indicating the determined location of the locator transponder 5 in the formed SAR/radar/ISAR image;

computing coordinates of the locator transponder 5 on the basis of the formed SAR/radar/ISAR image and of the location of the locator transponder 5 in the formed SAR/radar/ISAR image;

generating position data including the computed coordinates of the locator transponder 5 and, conveniently, also the formed SAR/radar/ISAR image in which the determined location of the locator transponder 5 is indicated; and providing the locator system control center 2 with the generated position data.

Detecting, in the echo signals received, the sequence of watermarked radar echo signals transmitted by the locator transponder 5 conveniently includes detecting the synchronization portion of the spread spectrum watermarking signal embedded in said sequence of watermarked radar echo signals transmitted by the locator transponder 5.

Moreover, extracting, from the sequence of watermarked radar echo signals detected, the temporary identification code of the locator transponder 5 conveniently includes extracting said temporary identification code from the information portion of the spread spectrum watermarking signal embedded in said sequence of watermarked radar echo signals detected.

Conveniently, one and the same chirp matched filter may be used for both SAR/radar/ISAR imaging and localization processing.

Forming a SAR/radar/ISAR image on the basis of the echo signals received conveniently includes:

removing the sequence of watermarked radar echo signals detected from the echo signals received, thereby obtaining watermark-free echo signals; and forming a watermark-free SAR image on the basis of the watermark-free echo signals.

Conveniently, the sequence of watermarked radar echo signals detected can be removed by means of a multiuser detection technique (for example, a technique based on MAX/TC criterion may be conveniently used).

Again with reference to FIG. 4, the locator system control center 2, upon reception of the position data from the SAR/radar/ISAR system 4,7,8, provides the user 9 with said position data (block 18 in FIG. 4)—conveniently, after payment for the localization service by said user 9—and, hence, said user 9 receives the requested location (block 19 in FIG. 4).

Preferably, the locator transponder 5 is further configured to switch from the localization mode to the idle mode after a predefined time of operation in the localization mode, and/or upon reception of an RF signal carrying a predefined command and transmitted by the communications satellite system/network 3/the paging system 6, or directly by the SAR/radar/ISAR system 4,7,8.

In fact, for example, after the locator system control center 2 has received the position data from the SAR/radar/ISAR system 4,7,8 or, alternatively, after it has provided the user 9 with said position data, said locator system control center 2 may conveniently ask the communications satellite system/network 3/the paging system 6, or the SAR/radar/ISAR system 4,7,8, to transmit a RF signal carrying a predefined command for causing the locator transponder 5 to switch from the localization mode to the idle mode, so as to enable said locator transponder 5 to start having again a very low power consumption.

The first/second/third locator system 1A,1B,1C can be used only for localization or also for information transmission from the locator transponder 5. In fact, either simultaneously to localization or once geographically located (depending on choice and application), the locator transponder 5 may be conveniently instructed by the communications satellite system/network 3/the paging system 6, or directly by the SAR/radar/ISAR system 4,7,8, to provide information data with a transmission mechanism embedded in, additional or similar to the aforesaid spread spectrum watermarking step (block 16 in FIG. 4).

The locator transponder 5, thanks to its innovative operating features previously described, can be advantageously made as an extremely small and light device (such as a coin/medal-sized device), which is equipped with a small integrated antenna (e.g., a patch antenna, a folded dipole or a Planar Inverted Folded Antenna (PIFA)) and which can be powered by a very small battery, being nevertheless capable of remaining active for years without requiring battery replacement (like any simple digital watch). Moreover, thanks to its reduced size, the locator transponder 5 may be arranged substantially in any place (if necessary, also in a hidden way). For example, the locator transponder 5 can be conveniently coupled to a car/truck roof, a freight container, a bike saddle, an iceberg, a ship/freighter, a surfboard, a wild animal, a (cross-country) skier helmet, etc. In this connection, a non-exhaustive and non-limiting list of examples of potential applications of the locator system according to WO 2018/162756 A1 includes:

localization of lost cars, trucks, bikes, etc. and of freighters, ships, surfboards, etc. lost at sea;

localization of personal belongings;

mapping of animal migratory flows;

tracking of icebergs and floating platforms;

localization of military vehicles, weapons, troops, etc. (for instance, for search and rescue purposes);

localization of tactical body armors and other tactical infrastructures;

criminal tagging with low probability of interception;

increase in visibility of reference geographical points for SAR imaging;

monitoring of the position and integrity of overhead power lines and external piping.

Innovative features and technical advantages of the locator system according to WO 2018/162756 A1 are concisely summarized here below:

use of a SAR/radar/ISAR system (such as a SAR/ISAR system employing one or more SAR/radar sensors carried on satellite(s) and/or aircraft(s) and/or drone(s) and/or helicopter(s), etc.—or a ground-based, naval/maritime, airborne or satellite radar system, e.g., a detection and search radar, an ATC radar, a weather radar, etc.) and of a radio communications system (such as a stand-alone radio communications system (e.g., a communications satellite system/network) or a (ad hoc) radio communications system directly integrated into the SAR/radar/ISAR system) to locate a small, light, low-cost, low power consumption, regenerative locator transponder;

the radio communications system is used to page and awake the locator transponder by using an extremely low data rate that, as in deep space communications, can endure an extremely poor link budget;

use of spread spectrum watermarking technique in a context that is completely different with respect to prior art, namely in order to generate and transmit a sequence of watermarked radar echo signals that have a power that is lower, in general, than background backscatter power level and, in particular, than clutter and noise power level, and convey the temporary identification code of a locator transponder to be located by means of a hidden, albeit detectable, watermark (in particular, detectable via spread spectrum code synchronization);

use of long permanent identification codes to serve a large community of users and of shortened temporary identification codes to minimize random information content of the signals transmitted by active locator transponders to be located at the same time;

total cancellation of watermark from SAR/radar/ISAR images via multiuser detection technique (e.g., based on MAX/TC criterion);

possibility of using the locator system also for information transmission from the locator transponders;

no impairment of normal SAR/radar/ISAR operation;

extremely low transmission power used by the locator transponders (e.g., transmission power of 1 mW) thanks to the combination of spread spectrum processing gain concept and regeneration;

possibility of immediately exploiting existing SAR, radar and ISAR systems;

possibility of using one and the same chirp matched filter for both SAR/radar/ISAR and localization processing.

OBJECT AND SUMMARY OF THE INVENTION

The Applicant has discarded non-regenerative solution for the locator transponders of the locator system according to WO 2018/162756 A1, since existing non-regenerative transponders are bulky and require large antennas (e.g., with diameters of the order of half a meter) to improve the link budget that, in case of a non-regenerative solution, adds up downlink and uplink noise.

On the other hand, during development of the locator system according to WO 2018/162756 A1, the Applicant has noticed that the adopted regenerative solution requires an accurate carrier frequency recovery by the locator transponders. As a matter of fact, for an accurate localization of a locator transponder, it is necessary that the carrier of the signals transmitted by said locator transponder remains stable and accurate throughout the period of contact with the SAR/radar/ISAR system.

As a matter of fact, on the assumption that a satellite SAR system is used, even a small deviation or drift of the carrier frequency used in transmission causes localization inaccuracy (e.g., a drift of 1 Hz may cause an inaccuracy of about 5 meters). Additionally, if the initial frequency error is not reduced within a limited range, the amount of processing required for detecting the signals from a transponder locator may become overwhelming (in fact, it might be necessary to search across a much wider frequency range).

Therefore, in order to maintain the localization accuracy typical of a SAR, the locator transponder should be equipped with a local oscillator that is capable of keeping its instantaneous frequency within +/−1 Hz around a nominal carrier frequency of, for example, 10 GHz throughout the period of contact with the satellite SAR system (e.g., for a time span of about 1 second) and that has a limited initial frequency error when switched on. Moreover, similar local oscillator accuracy and stability requirements apply, mutatis mutandis, also to non-satellite SAR case and to radar and ISAR cases.

In view of the foregoing, the adopted regenerative solution inevitably poses a choice: either accepting a strong degradation in localization due to the use of a low-cost, low power consumption, poorly accurate local oscillator, or adopting an expensive, power-hungry, accurate local oscillator (e.g., an oven-controlled crystal oscillator) for better localization accuracy and localization processing reduction.

Thence, an object of the present invention is that of providing, within the scope of the locator system and the localization method and service according to WO 2018/162756 A1, a frequency synchronization solution that allows avoiding degrading localization accuracy, without imposing the use of an expensive and power-hungry local oscillator and without requiring a search for transponder locators' signals within a wide frequency range.

More in general, object of the present invention is that of providing, within the scope of the locator system and the localization method and service according to WO 2018/162756 A1, an innovative solution that allows locator transponders to reliably and accurately perform frequency synchronization.

Additionally, a further object of the present invention is that of providing, within the scope of the locator system and the localization method and service according to WO 2018/162756 A1, an innovative solution that allows locator transponders to reliably and accurately perform also time synchronization.

These and other objects are achieved by the present invention in that it relates to a localization method, a locator system and a locator transponder, as defined in the appended claims.

In particular, the present invention concerns a localization method for locating a target that is coupled with a locator transponder associated with a permanent identification code permanently assigned to said locator transponder. Said localization method comprising:

a) upon reception of a user request for locating the target, transmitting, by a radio communications system, a spread spectrum paging signal carrying the permanent identification code and a temporary identification code temporarily assigned to the locator transponder, wherein said temporary identification code is shorter than said permanent identification code;

b) receiving, by the locator transponder, the spread spectrum paging signal and extracting, by said locator transponder, the temporary identification code carried by the received spread spectrum paging signal;

c) transmitting, by a radar-based system, radar signals towards one or more areas of earth's surface or sky and receiving, by said radar-based system, echo signals from said one or more areas of the earth's surface or sky;

d) upon reception by the locator transponder of one or more radar signals transmitted by the radar-based system, generating and transmitting, by said locator transponder, a sequence of watermarked radar echo signals in which a spread spectrum watermarking signal is embedded, wherein said spread spectrum watermarking signal carries the temporary identification code extracted; and e) carrying out, by the radar-based system, localization operations that include detecting, in the received echo signals, the sequence of watermarked radar echo signals transmitted by the locator transponder, extracting the temporary identification code carried by the spread spectrum watermarking signal embedded in the detected sequence of watermarked radar echo signals, and determining a location of the locator transponder on the basis of the detected sequence of watermarked radar echo signals.

Moreover, the localization method further comprises:

f) transmitting, by the radio communications system, one or more frequency-synchronization-aid signals; and g) receiving, by the locator transponder, the frequency-synchronization-aid signal(s) and estimating, by said locator transponder, based on the received frequency-synchronization-aid signal(s), a frequency drift affecting a reference frequency provided by a local oscillator of said locator transponder.

Thence, the locator transponder transmits the sequence of watermarked radar echo signals by using a transmission carrier frequency obtained based on the reference frequency provided by the local oscillator and on the estimated frequency drift.

Preferably, the localization method further comprises:

h) transmitting, by the radio communications system, one or more signaling-related signals carrying signaling data indicating one or more operating parameters of the radar-based system;

i) receiving, by the locator transponder, the signaling-related signal(s) and extracting, by said locator transponder, the signaling data carried by the received signaling-related signal(s); and j) estimating, by the locator transponder, based on the radar signals received from the radar-based system and on the extracted signaling data, timing parameters of the received radar signals.

Thence, the locator transponder preferably transmits the sequence of watermarked radar echo signals by using the estimated timing parameters.

Conveniently, estimating the frequency drift includes carrying out:

a coarse frequency drift estimation based on the received spread spectrum paging signal; and a fine frequency drift estimation based on the coarse frequency drift estimation and on the received frequency-synchronization-aid signal(s).

Conveniently, the radio communications system is a satellite radio communications system and the localization method further comprises:

transmitting, from a ground station to the satellite radio communications system, the frequency-synchronization-aid signal(s) to be transmitted by said satellite radio communications system;

receiving, by the ground station, the frequency-synchronization-aid signal(s) transmitted by the satellite radio communications system;

detecting, by the ground station, errors and/or shifts affecting the received frequency-synchronization-aid signal(s);

correcting, by the ground station, the received frequency-synchronization-aid signal(s) to compensate for the errors and/or shifts detected; and retransmitting, by the ground station, the corrected frequency-synchronization-aid signal(s) to the satellite radio communications system that retransmits said corrected frequency-synchronization-aid signal(s).

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

During the development of the locator system according to WO 2018/162756 A1, the Applicant has decided to adopt, for the transponder locator, a frequency reference solution based on the use of a low-cost, low power consumption, poorly accurate local oscillator so that the transponder locator may actually be a small-sized, light, low-cost, low power consumption device.

The Applicant has, thence, understood that, if the local oscillator is not accurate and stable, carrier frequency recovery should be performed based on a different link than the SAR/radar/ISAR one, since the period of contact with the SAR/radar/ISAR system is too short (e.g., 1s) to allow the locator transponder to carry out an accurate carrier frequency recovery and then transmit the watermarked radar echo signals with accurate and stable carrier frequency. In other words, the carrier frequency recovery is a time-consuming process that cannot be completed (or, anyway, cannot be performed with the accuracy necessary to achieve the desired localization accuracy) within the (extremely short) period of contact with the SAR/radar/ISAR system.

Contrariwise, the Applicant has understood that an accurate radar signal timing estimation may be performed based on the SAR/radar/ISAR link during the period of contact with the SAR/radar/ISAR system so that the locator transponder has still enough time to transmit the watermarked radar echo signals with accurate and stable signal timing. The present invention stems from the above Applicant's considerations and from the consequent innovative design choices made by the Applicant.

Figure 1:
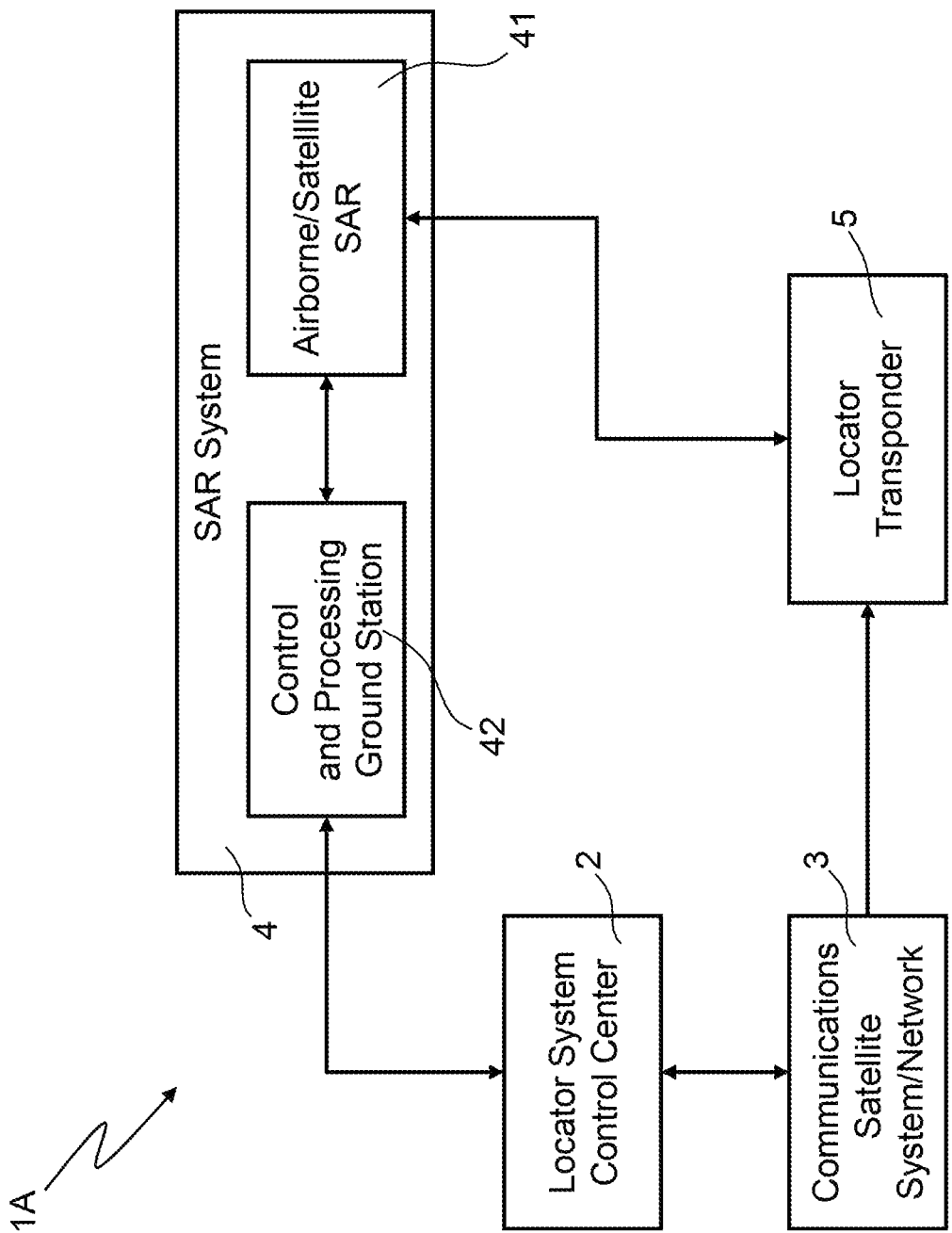
FIGS. 1, 2 and 3 schematically illustrate three examples of locator system disclosed in WO 2018/162756 A1.
Figure 2:
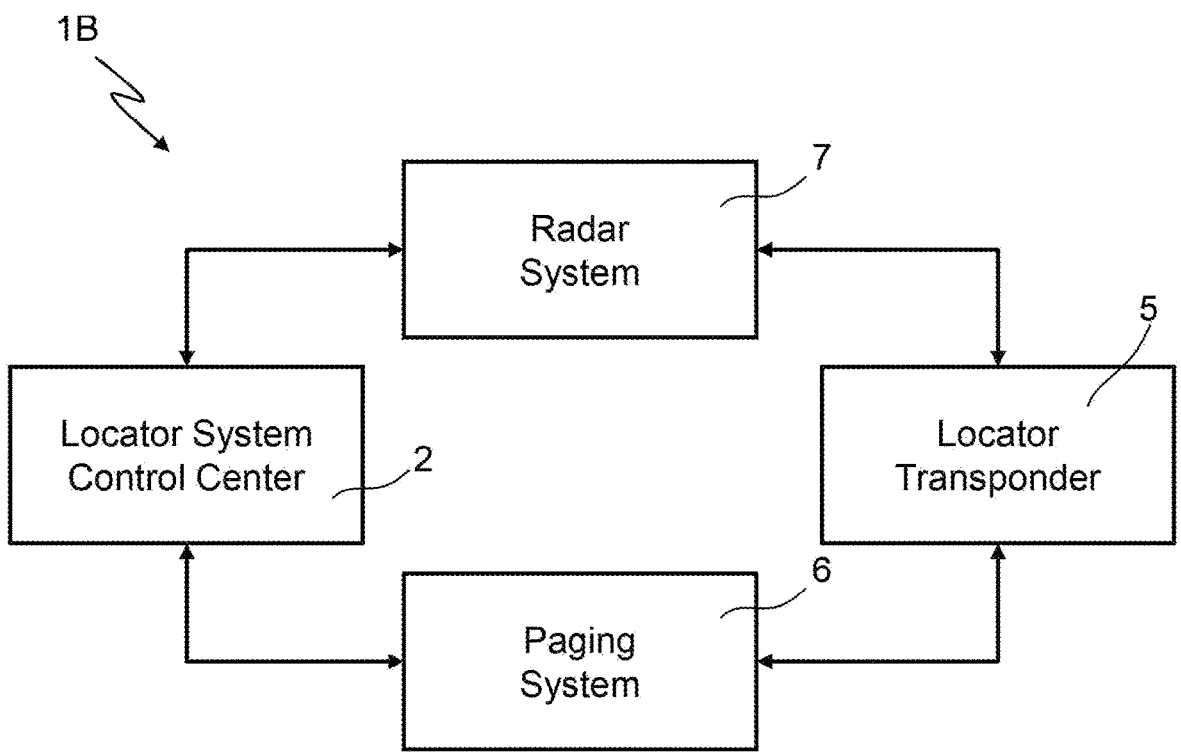
Figure 3:
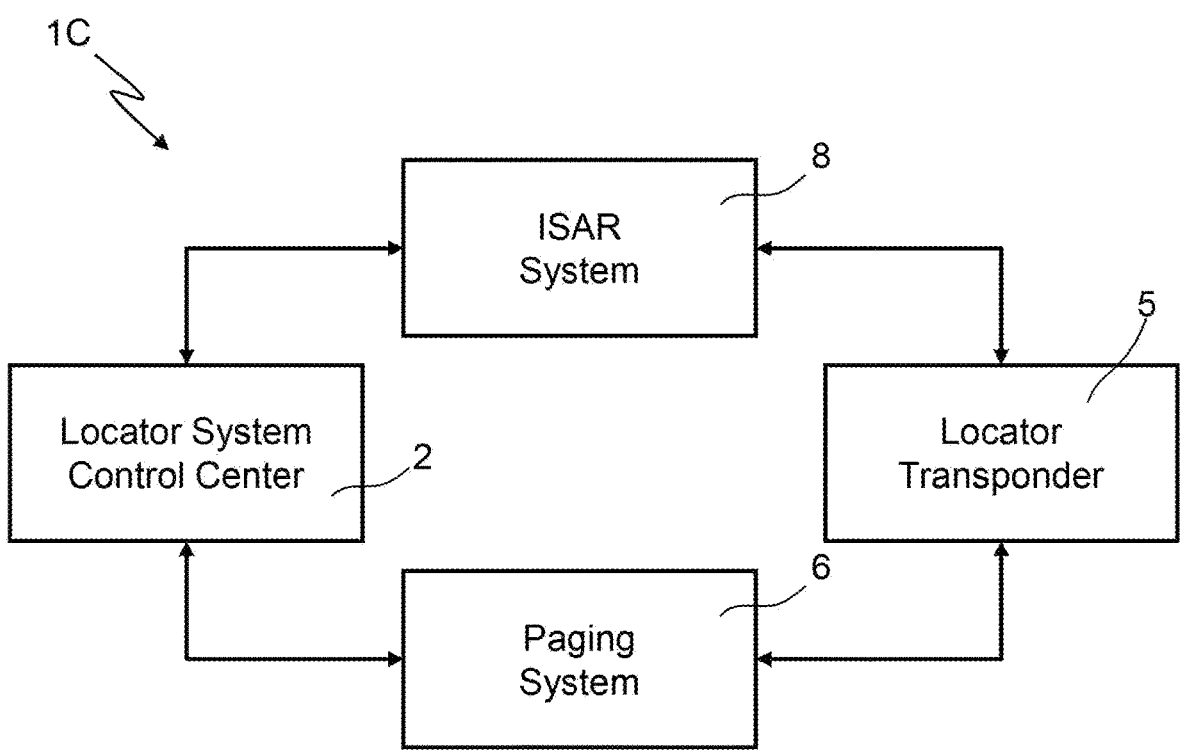
Figure 4:
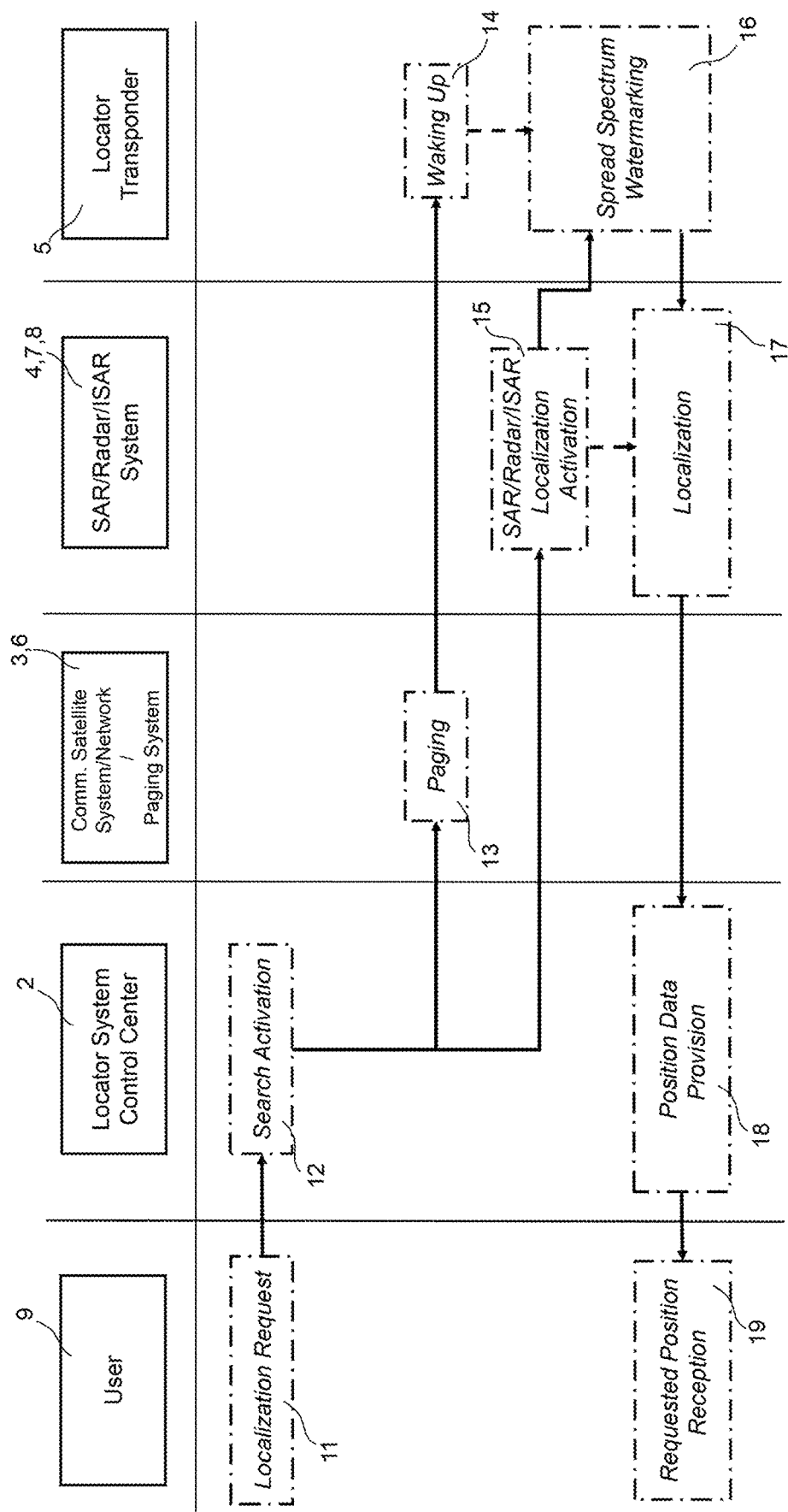
FIG. 4 schematically illustrates a localization method performed, in use, by the locator systems of FIGS. 1, 2 and 3.
Figure 5:
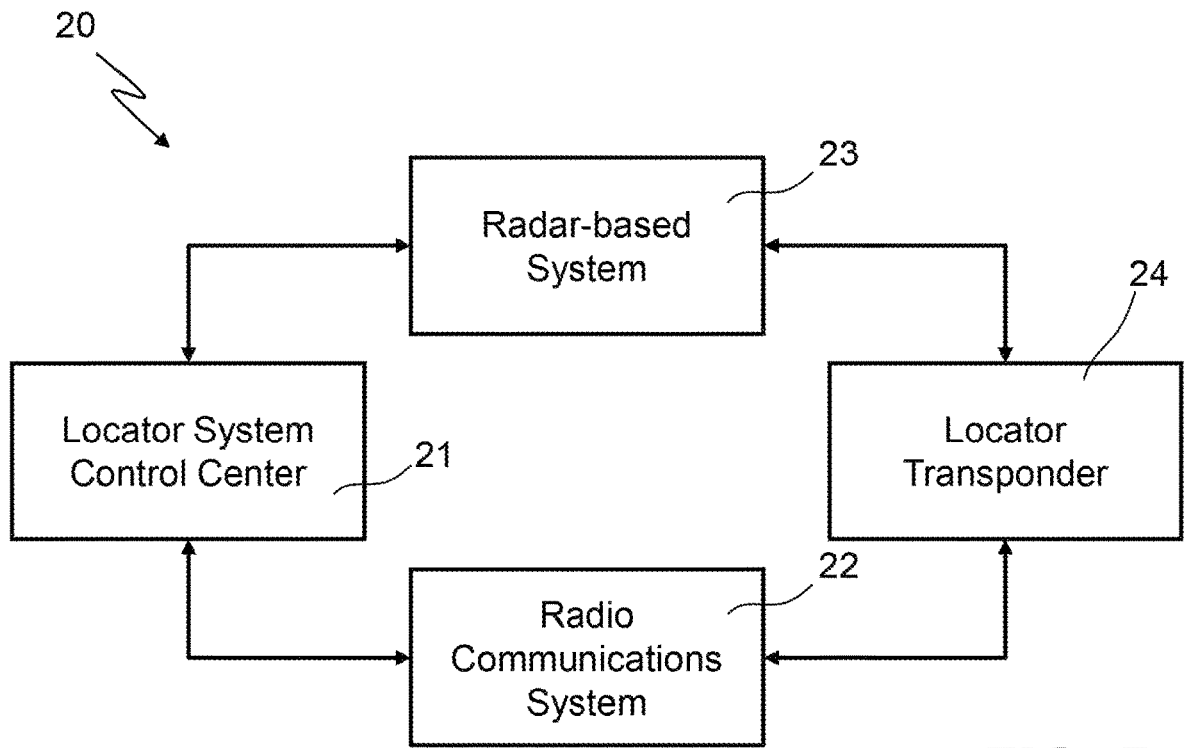
FIG. 5 schematically illustrates a locator system according to a preferred, non-limiting embodiment of the present invention.

For a better understanding of the present invention, FIG. 5 schematically illustrates a locator system (denoted as a whole by 20) according to a preferred, non-limiting embodiment of the present invention. In particular, as shown in FIG. 5, the locator system 20 includes:
- a locator system control center 21 designed to operate as the locator system control center 2 according to WO 2018/162756 A1 shown in FIGS. 1-4 and previously described in detail;
- a radio communications system 22 designed to
  - operate as the communications satellite system/network 3 according to WO 2018/162756 A1 shown in FIGS. 1 and 4 and previously described in detail, and/or as the paging system 6 according to WO 2018/162756 A1 shown in FIGS. 2-4 and previously described in detail, and
  - carry out also additional operations according to the present invention (that will be described in detail in the following);
- a radar-based system 23 designed to operate as the SAR system 4 according to WO 2018/162756 A1 shown in FIGS. 1 and 4 and previously described in detail, and/or as the radar system 7 according to WO 2018/162756 A1 shown in FIGS. 2 and 4 and previously described in detail, and/or as the ISAR system 8 according to WO 2018/162756 A1 shown in FIGS. 3 and 4 and previously described in detail; and
- a locator transponder 24 designed to
  - operate as the locator transponder 5 according to WO 2018/162756 A1 shown in FIGS. 1-4 and previously described in detail, and
  - carry out also additional operations according to the present invention (that will be described in detail in the following).

In this connection, it is worth noting that, in consideration of the foregoing detailed description of the technical features of the first, second and third locator systems 1A,1B,1C and of the related localization method according to WO 2018/162756 A1, hereinafter said technical features will not be described again, remaining valid what has been previously stated.

On the contrary, innovative, additional features/operations according to the present invention will be described in detail hereinafter. In this connection, reference is made to:
- FIG. 6 that schematically illustrates operations carried out, in use, by the radio communications system 22;
- FIG. 7 that schematically illustrates operations carried out, in use, by the locator transponder 24;
- FIG. 8 that schematically illustrates interactions, in use, of the locator transponder 24 with the radio communications system 22; and
- FIG. 9 that schematically illustrates interactions, in use, of the locator transponder 24 with the radar-based system 23.

Figure 6:
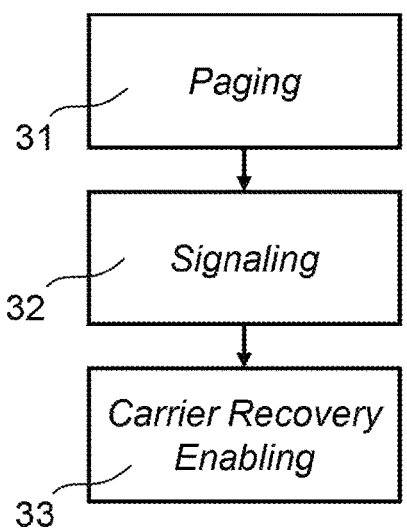
FIG. 6 schematically illustrates operations carried out, in use, by a radio communications system of the locator system of FIG. 5 according to a preferred, non-limiting embodiment of the present invention.

In particular, with specific reference to FIG. 6, the radio communications system 22 is configured to carry out:
- a paging step 31 that corresponds to the paging step 13 of localization method according to WO 2018/162756 A1 shown in FIG. 4 and previously described in detail;
- a signaling step 32 that includes transmitting one or more signaling-related signals carrying signaling data indicating one or more operating parameters of the radar-based system 23; and
- a carrier recovery enabling step 33 that includes transmitting one or more frequency-synchronization-aid signals to be used by the locator transponder 24 for carrier frequency recovery.

The locator transponder 24 is equipped with a local oscillator that is configured to provide a reference frequency (namely, a periodic signal having a reference frequency) to be used by said locator transponder 24 to transmit the watermarked radar echo signals.

Figure 7:
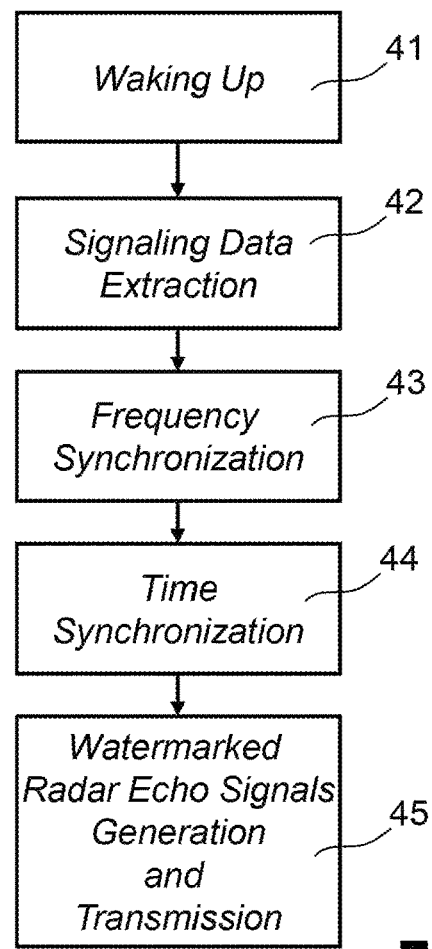
FIG. 7 schematically illustrates operations carried out, in use, by a locator transponder of the locator system of FIG. 5 according to a preferred, non-limiting embodiment of the present invention.
Figure 8:
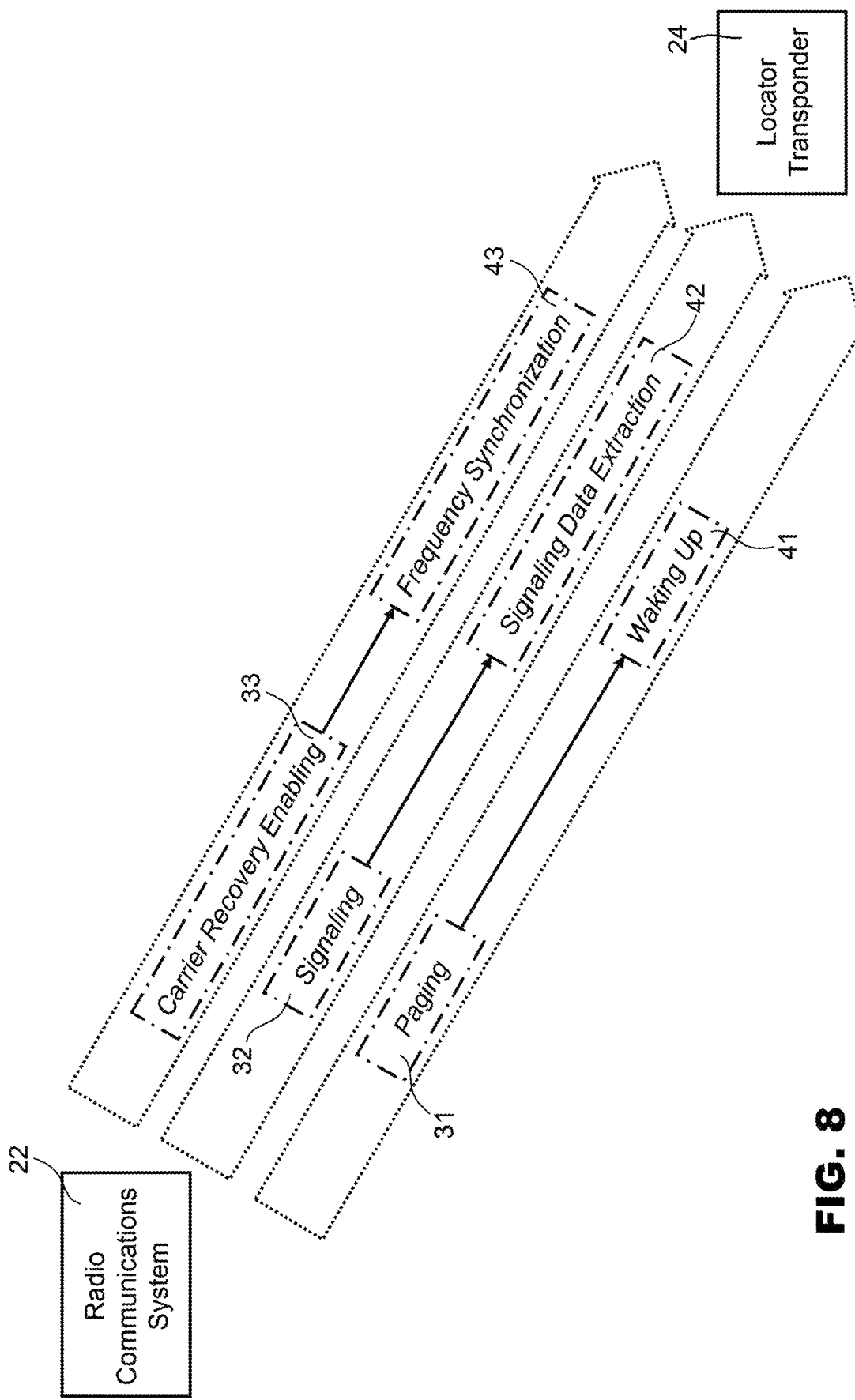
FIG. 8 schematically illustrates interactions, in use, of said locator transponder with said radio communications system according to a preferred, non-limiting embodiment of the present invention.

In particular, with reference to FIGS. 7 and 8, the locator transponder 24 is configured to:
- carry out a waking up step 41 that corresponds to the waking up step 14 of localization method according to WO 2018/162756 A1 shown in FIG. 4 and previously described in detail, wherein said waking up step 41 includes switching from the idle mode to the localization mode when the locator transponder 24 receives a spread spectrum paging signal that has been transmitted by the radio communications system 22 in the paging step 31 and that carries the permanent identification code associated with said locator transponder 24;
- receive the signaling-related signal(s) and the frequency-synchronization-aid signal(s) transmitted by the radio communications system 22;
- extracting the signaling data from the received signaling-related signal(s) (block 42 in FIG. 7 named "Signaling Data Extraction"); and
- carry out a frequency synchronization step 43 that includes estimating, based on the received frequency-synchronization-aid signal(s), a frequency drift affecting the reference frequency provided by the local oscillator.

Conveniently, the locator transponder 24 is configured to perform:
- in the waking up step 41, a coarse frequency drift estimation, which includes coarsely estimating the frequency drift affecting the reference frequency provided by the local oscillator and which is performed based on the received spread spectrum paging signal; and
- in the frequency synchronization step 43, a fine frequency drift estimation that includes finely estimating the frequency drift based on the coarse frequency drift estimation performed in the waking up step 41 and on the received frequency-synchronization-aid signal(s).

Figure 9:
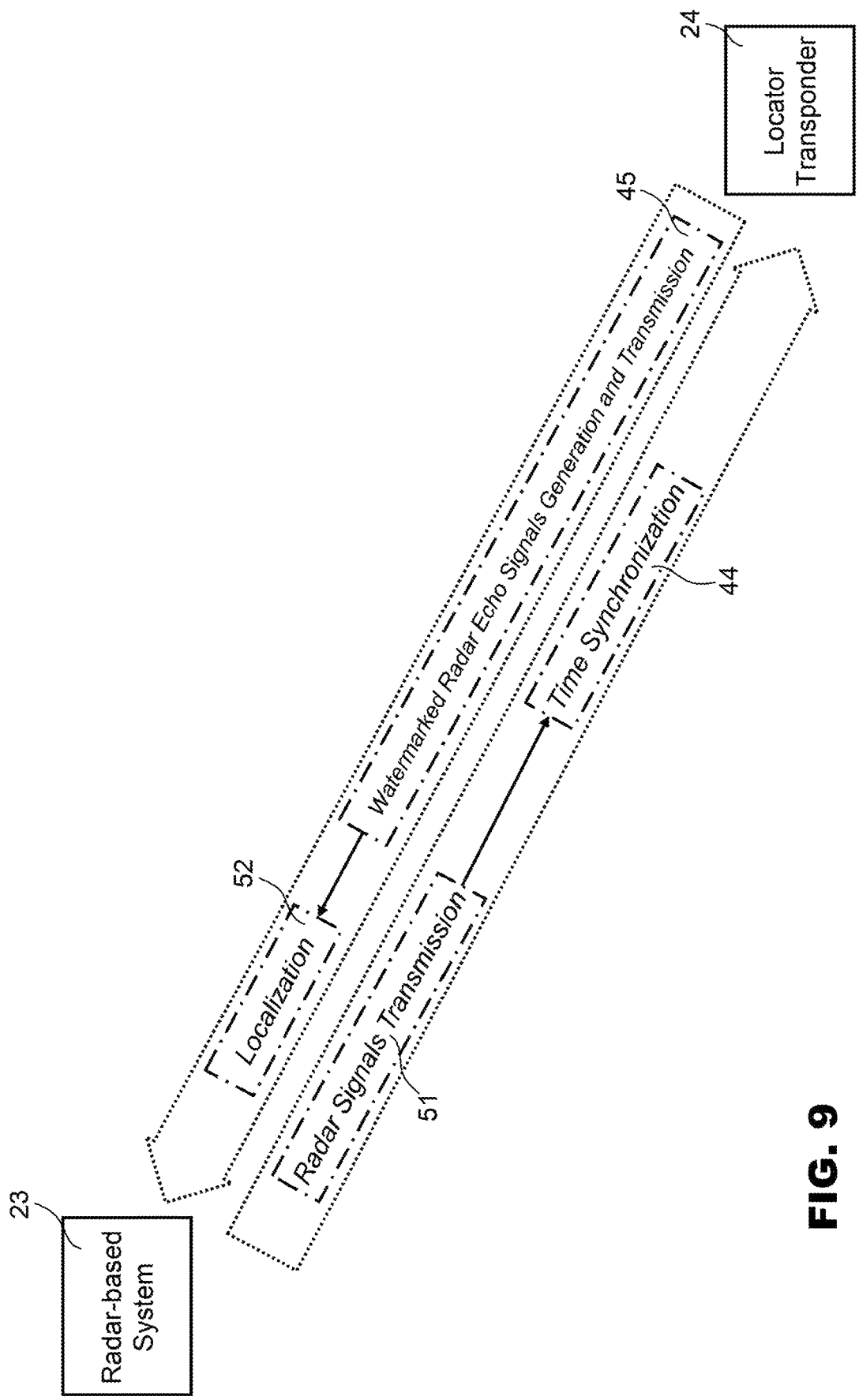
FIG. 9 schematically illustrates interactions, in use, of said locator transponder with a radar-based system of the locator system of FIG. 5 according to a preferred, non-limiting embodiment of the present invention.

As shown in FIG. 9 and described in detail in the foregoing and in WO 2018/162756 A1, once SAR/radar/ISAR localization has been activated (block 15 in FIG. 4), the radar-based system 23 transmits radar signals towards one or more areas of earth's surface or sky (block 51 in FIG. 9 named "Radar Signals Transmission").

Moreover, with reference to FIGS. 7 and 9, the locator transponder 24 is further configured to:
- carry out a time synchronization step 44 that includes estimating, based on radar signals received from the radar-based system 23 and on the extracted signaling data, timing parameters of the received radar signals; and
- generate and transmit watermarked radar echo signals (block 45 in FIGS. 7 and 9 named "Watermarked Radar Echo Signals Generation and Transmission") by using
  - a transmission carrier frequency obtained based on the reference frequency provided by the local oscillator and on the frequency drift estimated in the frequency synchronization step 43, and
  - the timing parameters estimated in the time synchronization step 44.

To put the foregoing in other words, the radio communications system 22, in use, transmits:
- a spread spectrum paging signal (Paging step—block in FIGS. 6 and 8) according to the teachings of WO 2018/162756 A1 and as described in detail in the foregoing;
- one or more signaling-related signals (Signaling step—block 32 in FIGS. 6 and 8) carrying signaling data indicating one or more operating parameters of the radar-based system 23 (e.g., nominal Pulse Repetition Interval (PRI) and/or nominal Pulse Repetition Frequency (PRF) and, conveniently, also radar signal waveform (i.e., chirp waveform), etc.); and
- one or more frequency-synchronization-aid signals (Carrier Recovery Enabling step—block 33 in FIGS. 6 and 8) to be used by the locator transponder 24 to carry out the frequency synchronization step 43 (e.g., an extremely narrowband tone or a spread spectrum signal may be conveniently used, both solutions allowing to relax frequency synchronization criticalities and to endure a critical and poor link budget).

In particular, the signaling-related signal(s) and the frequency-synchronization-aid signal(s) are transmitted after the transmission of the paging spread spectrum paging signal. Conveniently, the signaling-related signal(s) and the frequency-synchronization-aid signal(s) are transmitted at different times and/or at different frequencies and/or by using different spread-spectrum codes or, alternatively, by using residual carrier modulations in a simultaneous fashion.

Furthermore, the locator transponder 24, in use, performs the following operations:
- upon reception of a paging signal carrying its permanent identification code, it wakes up (Waking Up step—block 41 in FIGS. 7 and 8) by switching from the idle mode to the localization mode according to the teachings of WO 2018/162756 A1 and as described in detail in the foregoing (and, conveniently, it also estimates, or locks to, in a coarse way, the frequency drift affecting the reference frequency provided by its local oscillator);
- upon reception of the signaling-related signal(s) from the radio communications system 22, it extracts therefrom the signaling data (Signaling Data Extraction step—block 42 in FIGS. 7 and 8);
- upon reception of the frequency-synchronization-aid signal(s) from the radio communications system 22, it estimates (or, conveniently, it estimates in a fine way) the frequency drift affecting the reference frequency provided by its local oscillator (Frequency Synchronization step—block 43 in FIGS. 7 and 8);
- upon reception of radar signals from the radar-based system 23, it estimates timing parameters of the received radar signals (e.g., actual PRI (that may differ from the nominal one), Time Of Arrival (TOA) of the first radar chirp received, etc.) based on said received radar signals and on the extracted signaling data (Time Synchronization step—block 44 in FIGS. 7 and 8); and,
- finally, it generates and transmits (according to the teachings of WO 2018/162756 A1 and as described in detail in the foregoing) watermarked radar echo signals (Watermarked Radar Echo Signals Generation and Transmission step—block 45 in FIGS. 7 and 9) by using
  - a transmission carrier frequency obtained based on the reference frequency provided by the local oscillator and on the finely estimated frequency drift, and
  - the estimated timing parameters.

In this way, the locator transponder 24 is provided with the capability to transmit locally generated radar chirps with exact timing and high frequency accuracy and stability (e.g., a frequency stability of +/−1 Hz at 10 GHz) maintained throughout the period of contact with the radar-based system 23.

In particular, it is worth noting that the carrier recovery mechanism according to the present invention (which is based on the carrier recovery enabling step 33 carried out by the radio communications system 22 and the frequency synchronization step 43 carried out by the locator transponder 24) allows to use a low-cost, low power consumption, poorly accurate, microwave local oscillator (such as a low-cost, low power consumption, phase-locked microwave oscillator with natively poor accuracy and stability), which may even be affected by a quite large initial frequency error (e.g., of about 100 kHz) when switched on. In fact, the carrier recovery mechanism according to the present invention is such that to allow to accurately estimate the frequency drift affecting the reference frequency provided by the local oscillator and, hence, to obtain an accurate and stable carrier frequency to be used in transmission, thereby achieving the necessary frequency accuracy and stability (and, hence, the desired localization accuracy). For example, the carrier recovery mechanism according to the present invention allows to keep instantaneous frequency within +/−1 Hz around a nominal carrier frequency of 10 GHz throughout the period of contact with the radar-based system 23 (e.g., for a time span of about 1 second).

Conveniently, the time synchronization step 44 is carried out by means of a Finite State Machine (FSM)—namely, the locator transponder 24 is configured to implement a FSM—that is designed to minimize false detection probability and missed detection probability.

In this respect, it is worth noting that, typically, radar chirps transmitted by current SAR/radar/ISAR systems have enough power to allow chirp timing (e.g., actual PRI, TOA, etc.) to be estimated based on even a very limited number of detected chirps.

In order to better understand the present invention, it is worth noting that the localization of the locator transponder 24 (and, conveniently, also the measurement/estimation of one or more parameters/features of interest related to said locator transponder 24, such as the speed thereof) performed by the locator system 20 is (are) based on two main measurements: the timing and the (dynamically variable) centre frequency of the carrier of the watermarked radar echo signals received by the radar-based system 23 from the locator transponder 24. Thence, in order to achieve extremely high localization performance, as explained in the foregoing, the synchronization in time and in frequency performed by the locator transponder 24 is split into two steps, namely the frequency synchronization step 43 assisted by the radio communication system 22 and the time synchronization step 44 based on the radar signals received from the radar-based system 23 and the signaling data received from the radio communications system 22. As for the frequency synchronization step 43, it is important to note that an accurate estimation of the carrier frequency can be a time-consuming process that cannot be performed based directly on the radar signals received from the radar-based system 23 due to a too short period of contact of the locator transponder 23 with the radar-based system 23.

Additionally, it is worth noting also that the fact of performing the frequency synchronization step 43 (i.e., the carrier recovery) before the time synchronization step 44 improves also the accuracy of the estimation of the timing parameters in said time synchronization step 44, with a cross-fertilization effect.

In view of the foregoing, the locator transponder 24 is provided with the capability to:
have the carrier frequency already aligned/synchronized when illuminated by the radar signals transmitted by the radar-based system 23;
estimate TOA of the received radar signals and quickly switch into transmission mode during the period of contact with the radar-based system 23, synergistically exploiting
the transmission carrier frequency obtained based on the reference frequency provided by its local oscillator and on the frequency drift estimated in the frequency synchronization step 43, and
the timing parameters estimated in the time synchronization step 44 (e.g., the actual PRI estimated based on the radar signals received from the radar-based system 23 and the nominal PRI received, as signaling data, from the radio communications system 22), thereby achieving maximum localization accuracy;
reply with maximum accuracy after having received a few radar waveforms (e.g., chirps); and
carry on estimating the frequency drift based on the frequency-synchronization-aid signal(s) from the radio communications system 22 also during reception of the radar signals from the radar-based system 23 or, if necessary, even during the transmission of the watermarked radar echo signals.

According to a first preferred embodiment of the present invention, the radio communications system 22 may conveniently be a telecommunications system, preferably a satellite telecommunications system (such as a telecommunications system employing a geostationary satellite or a constellation of geostationary satellites). This first preferred embodiment substantially enables an immediate use of the present invention (i.e., in a short-term scenario).

Instead, according to a second preferred embodiment of the present invention, the radio communications system 22 may conveniently be integrated with the radar-based system 23 on board one or more same platforms (e.g., one or more same satellite(s) and/or aircraft(s) and/or drone(s) and/or helicopter(s) and/or ground-based platform(s) and/or land vehicle(s) and/or naval unit(s), etc.). This second preferred embodiment could be advantageously exploited in a mid-term scenario (for example, when it will be possible to manufacture and launch new satellites equipped with both a SAR sensor and a telecommunications unit designed to operate as the radio communications system 22). In this case, the period of contact of the locator transponder 23 with the radio communications system 24 is much longer than the period of contact of the locator transponder 23 with the radar-based system 23 due to the fact that a SAR/radar/ISAR system, in order to properly operate, typically requires a much more directive antenna that those used for radio communications.

Conveniently, the radar-based system 23 can be:
a SAR system (such as a SAR system employing one or more SAR sensors carried on satellite(s) and/or aircraft(s) and/or drone(s) and/or helicopter(s), etc.),
an ISAR system (such as an ISAR system employing one or more radar sensors carried on satellite(s) and/or aircraft(s) and/or drone(s) and/or helicopter(s), etc.);
or even a generic radar system (such as a ground-based, naval/maritime, airborne or satellite radar system— e.g., a detection and search radar, an ATC radar, a weather radar, etc.).

Figure 10:
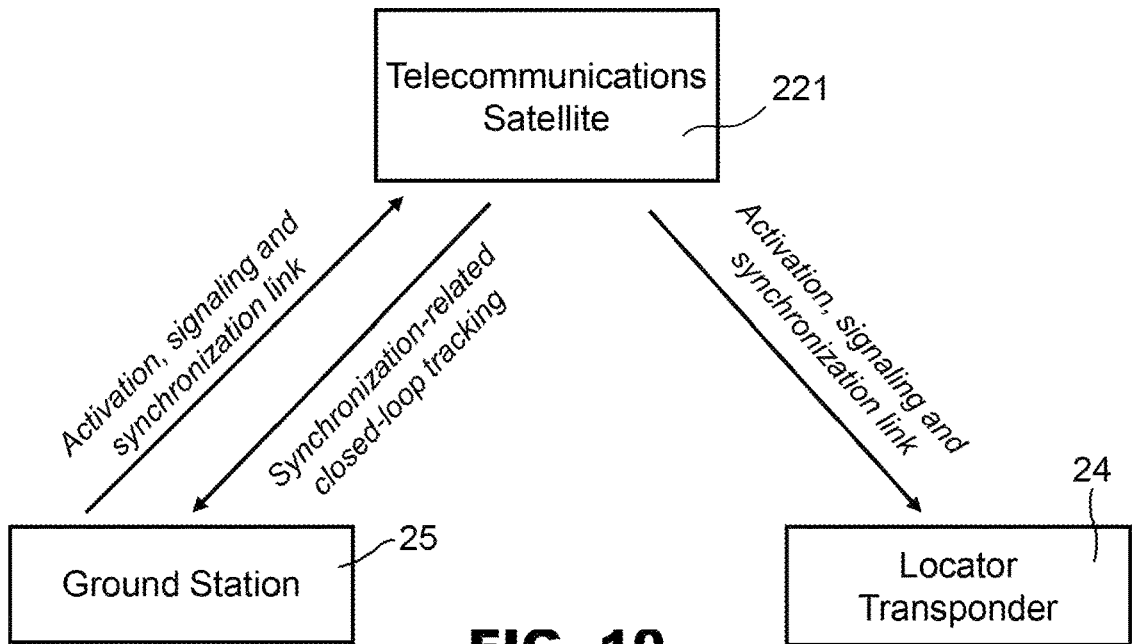
FIG. 10 schematically illustrates a preferred, non-limiting embodiment of an aspect of the present invention.

FIG. 10 schematically illustrates a preferred, non-limiting embodiment of an aspect of the present invention. In particular, FIG. 10 shows the use, as the radio communications system 22, of a telecommunications satellite 221 (e.g., a telecommunications geostationary satellite) fed/controlled by a ground station 25 to provide the locator transponder 24 with an activation, signaling and synchronization link (i.e., to transmit thereto the spread spectrum paging signal, the signaling-related signal(s) and the frequency-synchronization-aid signal(s)). Conveniently, the locator system control center 21 might be integrated into the ground station 25 or remotely connected thereto.

As shown in FIG. 10, a downlink synchronization-related closed-loop tracking link may be conveniently exploited, between the telecommunications satellite 221 and the ground station 25, to cancel any satellite Doppler shift/error and any drift/error of the on-board oscillator of the telecommunications satellite 221, thereby guaranteeing that the frequency-synchronization-aid signal(s) delivered to the locator transponder 24 is/are exactly as good as the reference available at the ground station 25 (e.g., a rubidium clock reference). Since this correction mostly counteracts slow frequency variations, this is feasible notwithstanding the round-trip delay from the ground station 25 to the telecommunications satellite 221 and back.

In other words, this synchronization-related closed-loop tracking mechanism allows the ground station 25 to measure the closed-loop error introduced by the telecommunications satellite 221 so that any error due to non-ideal communication link is corrected and the frequency-synchronization-aid signal(s) dispatched to the locator transponder 24 tend(s) to the original accuracy of the frequency reference available at the ground station 25. For example, the closed-loop correction performed by the ground station 25 cancels any Doppler effect due to satellite motion and/or any drift of (or error due to) satellite's on-board oscillator.

According to the above second preferred embodiment of the present invention, the telecommunications satellite 221 may be conveniently equipped also with a SAR sensor, thereby integrating also the radar-based system 23.

For a better understanding of the present invention, several non-limiting examples of implementation of different features/aspects/components of the present invention and related theoretical remarks will provided hereinafter.

1. PAGING AND WAKING UP STEPS

Conveniently, in the paging and waking up steps 31 and 41, the minimum frequency synchronization accuracy sufficient to enable spread spectrum paging signal detection is achieved by the locator transponder 24 by means of a very low power consumption circuitry, which is not necessarily always on, but it may be conveniently switched on and off depending on the length and the periodicity of the spread spectrum paging signal dispatched to the locator transponders by the radio communications system 22 in broadcast mode. Trade-offs may be conveniently defined for the switching-on time and the duration of the paging and waking up steps 31 and 41 that contribute to the overall localization time.

In order to ease coarse frequency synchronization performed by the locator transponder 24 in the waking up step 41, a direct residual tone modulation or a spread spectrum expanded unmodulated tone may be conveniently used by the radio communications system 22 in the paging step 31. The information transfer may be conveniently carried out in different ways including subcarrier located spread spectrum modulated data, with a specific dedicated code (as typically done, even if for different reasons, in deep space communications). In the present case, the residual tone guarantees the sufficient frequency synchronization for spread spectrum paging signal detection, while the spreading of the original paging data sequence guarantees capturing enough power from the radio communications system's on-board power amplifier to close the link budget while not exceeding a power spectrum density limit. In these considerations, the assumption of non-critical uplink budget is typical, since the gateway to radio communications system link budget is not critical, while the radio communications system 22 to locator transponder 24 link budget is at a premium.

The locator transponder 24, in order to minimize power consumption, can conveniently implement some sections with minimum-complexity analog circuitry. In addition, in order to counteract phase noise of low-cost oscillators, a differential modulation choice can be conveniently adopted for analog coarse frequency synchronization and paging detection sections, which choice allows use of channels in which coherence time is short. Conveniently, the spread spectrum paging signal may be conveyed by a spread-spectrum-based differential modulation resilient to phase noise. For example, if a differential Binary Phase-Shift Keying (BPSK) is used, the local oscillator phase rotation error, from symbol to symbol, may conveniently guarantee to avoid adding up a 180-degree rotation that would cause a symbol error. This requirement, associated with a decision of a binary symbol, is typically much less demanding than estimation of a phase.

The code acquisition time may be conveniently minimized by use of a clock so that the error in the initial setup of the code phase is only affected by the inaccuracy of the local clock. In general, the code length is not mandatorily related to the processing gain: a short code can be conveniently repeated to increment the processing gain, but a shorter synchronization phase is paid with a poorer synchronization procedure link budget gain. All these aspects may be conveniently taken into account and balanced in preliminary design phase.

The spread spectrum paging signal detection circuitry of the locator transponder 24 may be conveniently kept on for a time defined on the basis of: the code acquisition time, the duration of the paging sequence, the maximum number of locator transponders to be paged simultaneously, and the length of the permanent identification codes (that depends on the number of locator transponders 24 belonging to the locator system 20). Reasonably, the percentage of time in which the spread spectrum paging signal detection circuitry is on is small (e.g., of the order of 1-5%), thereby further reducing power consumption.

2. CARRIER RECOVERY ENABLING AND FREQUENCY SYNCHRONIZATION STEPS

As previously explained, in the frequency synchronization step 43, a fine frequency synchronization is conveniently performed by the locator transponder 24 based on the coarse frequency synchronization performed in the waking up step 41 and on the frequency-synchronization-aid signal(s) received from the radio communications system 22 (carrier recovery enabling step 33). In this connection, it is worth noting that carrier estimation accuracy necessary for a simple binary digital modulation bit decision (as the one performed by the locator transponder 24 in the waking up step 41) may be conveniently much lower than that necessary for the transmission of the watermarked radar echo signals by the locator transponder 24 to the radar-based system 23. This higher accuracy is conveniently achieved quite soon after the waking up (e.g., in a time that can span from a few tens of seconds up to a minute).

In order to ease the fine frequency synchronization performed by the locator transponder 24 in the frequency synchronization step 43, a direct residual tone modulation or a spread spectrum expanded unmodulated tone may be conveniently used by the radio communications system 22 in the carrier recovery enabling step 33 (said direct residual tone modulation or spread spectrum expanded unmodulated tone can be either the same as the one(s) used in the paging and waking up steps 31 and 41, or different one(s)).

3. TIME SYNCHRONIZATION AND WATERMARKED RADAR ECHO SIGNALS GENERATION AND TRANSMISSION STEPS

In a time span that may range from the waking up time to a few hours later (e.g., about four hours, considering a maximum satellite SAR revisit time of approximately four hours), the radar-based system 23 is in contact with the locator transponder 24. In particular, during the period in which the directive antenna of the radar-based system 23 transmits and receives to/from the geographical location of the locator device 24 (that, in case of a satellite SAR system, typically lasts approximately one or two seconds), the locator transponder 24 must carry out both the time synchronization step 44 and the watermarked radar echo signals generation and transmission step 45.

Conveniently, in the time synchronization step 44, both receiving sections of the locator transponder 24 for frequency-synchronization-aid signal(s) reception and for radar signals reception are on, respectively estimating chirp timing based on the radar signals received from the radar-based system 23 and carrying on tracking carrier frequency based on the frequency-synchronization-aid signal(s) received from the radio communications system 22. This is simultaneously possible since the radar and telecommunications bands are normally sufficiently distant to avoid interference at the receiving sections.

On the other hand, when the locally-generated watermarked radar echo signals start to be transmitted by the locator transponder 24, conveniently a digital loop (or an estimator with feedforward correction circuit) in charge of maintaining carrier frequency synchronization may be permanently or periodically switched off during the transmission. Conveniently, a RF switch may be employed to shunt to ground the part of transmission power that may be harmfully coupled into the receiving section(s). This phase of the estimation may be conveniently avoided if the coherence time of the local oscillator frequency random walk is sufficiently long, blocking the frequency estimator or the digital loop to the value or status immediately preceding the watermarked radar echo signals transmission.

A similar procedure may be conveniently followed for SAR, radar and ISAR, enabling all of the measurements with the best accuracy (localization, speed measurements, interferometric measurements, etc.).

4. PREFERRED, NON-LIMITING EMBODIMENT FOR TIME SYNCHRONIZATION

Figure 11:
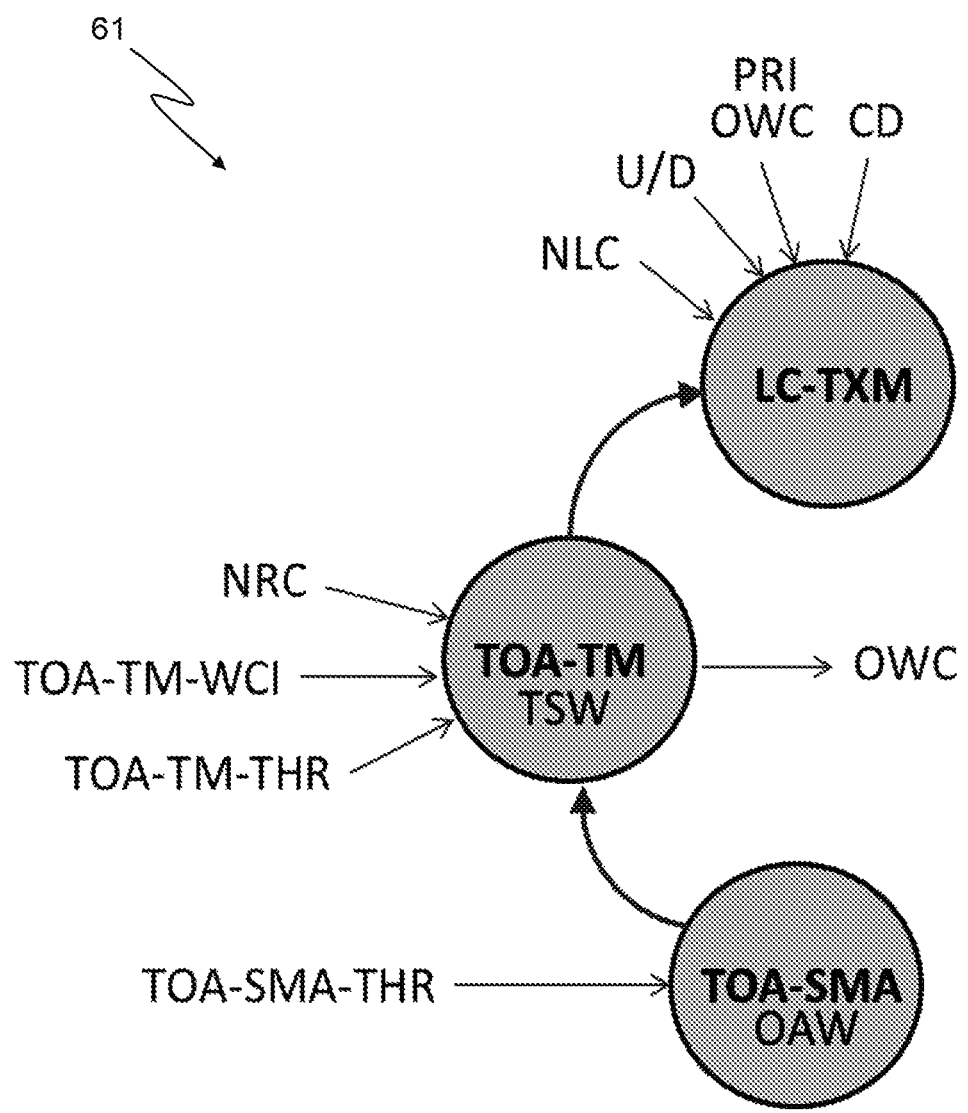
FIG. 11 schematically illustrates an example of Finite State Machine (FSM) designed to carry out a time synchronization step according to a preferred, non-limiting embodiment of the present invention.

FIG. 11 schematically illustrates (in particular, by means of a schematic directed graph representation) an example of FSM (denoted as a whole by 61) designed to carry out the time synchronization step 44 according to a preferred, non-limiting embodiment of the present invention.

In detail, in FIG. 11, three states "TOA-SMA", "TOA-TM" and "LC-TXM" of the FSM 61 are represented, each, by a respective circle, whereas arrows are used to represent state transitions and input and output parameters to/from each state.

The TOA-SMA state (wherein TOA-SMA stands for Time Of Arrival-Search Mode Acquisition) is the initial state, in which the locator transponder 24 (conveniently, its receiver time synchronization section) continuously searches (in an Open Acquisition Window—OAW) for the instant in which the output of the radar signal matched filter exceeds a specific voltage threshold, which is a function of the received radar signal energy. In FIG. 11, this specific voltage threshold is named TOA-SMA-THR (which stands for Time Of Arrival-Search Mode Acquisition-THReshold).

When the above voltage threshold is exceeded, the FSM 61 passes from the TOA-SMA state to the TOA-TM state (wherein TOA-TM stands for Time Of Arrival-Tracking Mode), in which the locator transponder 24 (conveniently, its receiver time synchronization section) searches, only within a limited time span TSW (which stands for Tracking Small Window), around a TOA-TM-WCI (which stands for Time Of Arrival-Window Central time Instant), for an exceeding of another threshold (in FIG. 11 named TOA-TM-THR, which stands for Time Of Arrival-Tracking Mode-THReshold). When the FSM 61 is in the TOA-TM state, the receiver time synchronization section of the locator transponder 24 estimates also an Optimum Window Centre (OWC). This may vary for a number of reasons for SAR, radar and ISAR cases. In particular, for satellite SAR case, the variable height, as the satellite moves along the orbit, imposes local PRI adaptation/variation.

The TOA-SMA-THR and TOA-TM-THR may be conveniently defined based on a trade-off between a desired probability of missed detection and false acquisition and a desired tracking mode reliability (probability of wrong correlation peak selection and probability of missed correlation peak).

When a number of correlation peaks equal to NRC (which stands for Number of Received Chirps) has been detected (typically, a number ranging from four to ten), the FSM 61 passes from the TOA-TM state to the LC-TXM state (wherein LC-TXM stands for Local Chirp-Transmission (TX) Mode), in which the locator transponder 24 transmits the locally-generated watermarked radar echo signals. Should a chirp be missed by the locator transponder 24, no problem arises in the localization procedure since a different "range migration" is observed on users located in different places. Therefore, the localization procedure does not require that the locator transponder 24 exactly responds to the first waveform that illuminates said locator transponder 24. As shown in FIG. 11, parameters of the LC-TXM state (some used for performance optimization) are:

Number of Locally Transmitted Chirps (NLC);
Up or Down frequency ramping mode (U/D);
Pulse Repetition Interval-Optimum Window Centre (PRI-OWC) estimated in the TOA-TM state; and
Chirp Duration (CD).

Conveniently, some, or even all, of the above parameters (or at least their nominal values) may be included in the signaling data transmitted by the radio communications system 22.

5. REMARKS CONCERNING TIME SYNCHRONIZATION FOR SATELLITE SAR CASE

As previously explained, the time synchronization step 44 (in particular, radar signal TOA estimation) is performed after the frequency synchronization step 43 (i.e., carrier recovery) and after the radio communications system 22 has provided the signaling data including the nominal PRF or PRI. At that time, the locator transponder is in "SAR chirps waiting mode", waiting for reception of SAR chirps for a time that is shorter than, or equal to, satellite SAR revisit time. The probability of false reception of a chirp depends on a threshold. The chirp energy is easily distinguishable from the background thermal noise (by a ratio defined by the Ec/No); the probability of passing a threshold, due to noise, being such a value well over 10 dB, is very low, and the subsequent reception of, for example, three chirps, two of which within the exact PRI time window, is extremely low. Hence, the threshold for the chirp detection can be set so low to avoid or minimize the risk of missing the first chirp received. A chirp arriving from an antenna sidelobe may be detected as the first. In such a case, the elevation distance will cause an ambiguity. Hence, after a number of chirps after the first matching the exact time opening of the chirp matched filer, the locator transponder 24 activates the chirp replica generation.

Figure 12:
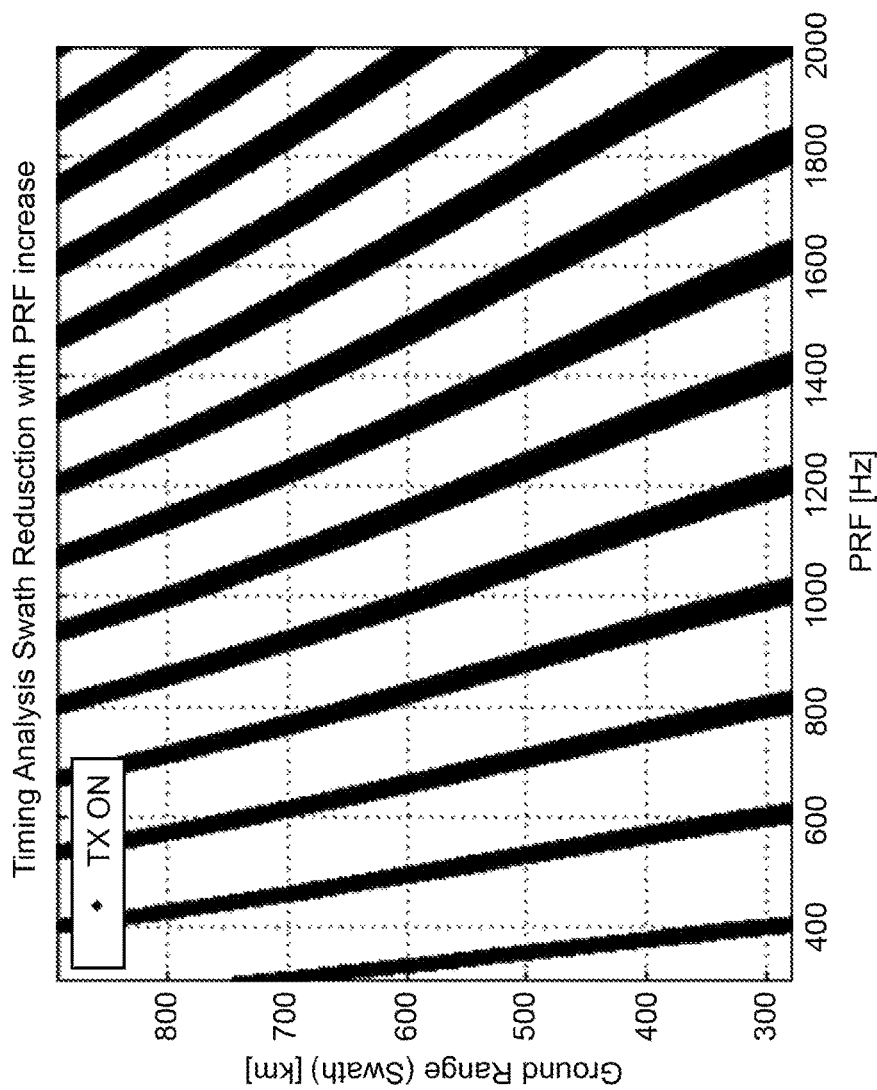
FIG. 12 schematically illustrates an example of range and azimuth ambiguity issues for satellite SAR case.
Figure 12:
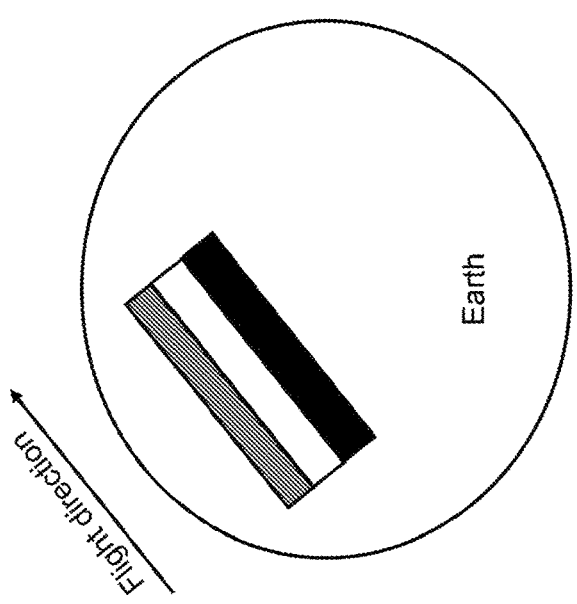

With reference to such a context, FIG. 12 schematically illustrates an example of range and azimuth ambiguity issues for the satellite SAR case. From the right graph in FIG. 12, it is clear that selecting, for example, a PRF of 2000 Hz, it is possible to cover:

a swath of 110 km, in particular from 330 km to 440 km ground range (grey swath in the left Earth's schematic picture of FIG. 12);

a swath of 90 km, in particular from 480 km to 570 km ground range (white swath in the left Earth's schematic picture of FIG. 12);

a swath of 70 km, in particular from 610 km to 680 km ground range (black swath in the left Earth's schematic picture of FIG. 12).

Due to range and elevation secondary beams of the satellite SAR's antenna, the locator transponder 24 can detect chirps transmitted toward a different swath area (for example, assuming it is located in the grey or black swath, it can detect chirp transmitted toward the white swath) and, thence, when the satellite SAR is imaging the white center swath, with a 90 km swath size, the locator transponder 24 might respond (if thresholds are not accurately set) from the grey or black swath, with a behavior that may be interpreted by the SAR image processing center exactly as an ambiguity. The probability of occurrence of such a phenomenon can be minimized for given SAR antenna sidelobe features, by optimizing detection thresholds. Then, this issue can be removed after all the three swaths are analyzed, or the received power of the locator transponder 24 is compared, at the SAR imaging processor, with an expected power. Instead, the azimuth ambiguity is not an issue, because the potential activation by an azimuth sidelobe does not cause ambiguity in the azimuth focusing and, provided the number of transmitted chirps is increased by a margin to cover a desired time of satellite passage, no impact is expected on localization performance.

6. REMARKS CONCERNING THE INVENTION

As previously explained, in order to achieve extremely high localization performance, according to the present invention the synchronization in time and in frequency performed by the locator transponder 24 is split into two steps, namely the frequency synchronization step 43 assisted by the radio communication system 22 and the time synchronization step 44 based on the radar signals received from the radar-based system 23 and the signaling data received from the radio communications system 22.

This strategy for synchronization, in addition to solving the problem of achieving accurate carrier synchronization within the time of contact of the locator transponder 24 with the radar-based system 23, enables cross-fertilization of the overall localization quality also enhancing the obtained time synchronization.

Moreover, the present invention allows improving accuracy of measuring of any parameter, such as speed or any interferometric measurement, and of any frequency- and time-sensitive product of SAR/radar/ISAR type. It would be impossible to achieve such an accurate carrier frequency synchronization without the use of the radio communications system 22 in addition to the radar-based system 23.

Alternative solutions, such as those based on accurate oven-controlled oscillators, are bulkier, more expensive and dramatically power-hungry with respect to the solution according to the present invention.

Figure 13:
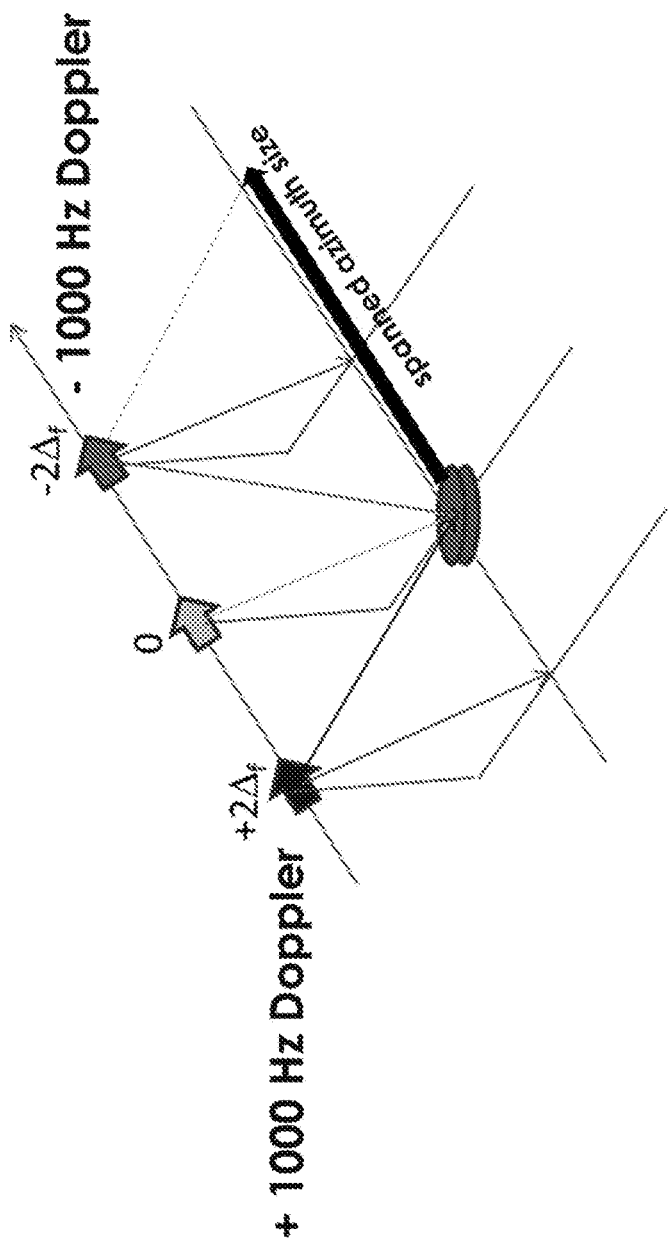
FIG. 13 schematically illustrates a typical scenario of existing SAR systems wherein the whole information in azimuth localization is contained into a +/−1000 Hz range.

In order to provide an example of the impact of a 1 Hz frequency error during the period of contact of the locator transponder 24 with the radar-based system 23, it may be useful to consider that, with typical parameters of existing satellite SAR systems, the whole information in azimuth localization is contained, more or less, into a +/−1000 Hz range (as schematically illustrated in FIG. 13). Therefore, if the local carrier reference at the locator transponder 24 does not maintain a +/−1 Hz accuracy and stability, the accuracy would drop much below a 5 m accuracy. As previously explained, the present invention allows to achieve these accuracy and stability.

For example, assuming a satellite altitude of approximately 620 km, an antenna size equal to 5.6×1.4 m (azimuth×elevation). The resulting half power beamwidth is assumed to be about 0.28×1.13 degrees (azimuth×elevation). The approximate formula that can be used to estimate the half power beamwidth, expressed in radians, is $$\alpha|_{radians} = \frac{0.8\lambda}{L}$$

or, when expressed in degrees, $$\alpha|_{degrees} = \frac{45.5\lambda}{L}.$$

The access area considered is 25-50 degrees (the maximum, with mechanical steering assistance, is 20-59 degrees). The satellite speed is:

$$v = \sqrt{\frac{Gm_E}{r}} = \sqrt{\frac{(6.67 \times 10^{-11} \text{Nm}^2/\text{kg}^2)(5.98 \times 10^{24})}{(6.38 \times 10^6) + (6.20 \times 10^5)}} = 7548 \text{ m/s}.$$

From the above considerations, the component of the satellite speed in the radial direction is 36.86 m/s, leading to a maximum Doppler shift of about 1228 Hz. Hence, a great accuracy must be required for the chirp center frequency, in both estimation and generation. In particular, as previously explained, a 1 Hz frequency estimation accuracy is required, which accuracy can be achieved thanks to the present invention.

7. FREQUENCY SYNCHRONIZATION ISSUES

According to traditional theory, the quality of an oscillator is defined by a mathematical model and its relevant parameters. Not focusing on output signal amplitude instability and highlighting the less dynamical frequency instability, the signal s(t) generated by an oscillator is given by the expression:

$$s(t) = A \; sen[2\pi(f_c + \tilde{f}_e) + \overline{\phi}(t)].$$

Normally, it is desired that the generated signal s(t) adheres as close as possible to a sinusoidal signal with predetermined and precisely known frequency $f_c$. In the above formula $\tilde{f}_e$ denotes a Gaussian random variable with zero mean and standard deviation $\sigma_f$, associated to manufacturing differences, temperature variation, technological process instabilities, that is assumed not to vary within a time span of 20 seconds. In the above formula $\overline{\phi}(t)$ is an ergodic stochastic process, whose power spectral density (PSD) is defined by the phase noise characteristics of the oscillator itself.

The random process $\overline{\phi}(t)$ is normally characterized with a piecewise power-law PSD that, when anti-transformed in time domain using the Wiener-Khinchin theorem, leads to an autocorrelation of a strongly correlated stochastic process that, as known, exhibits also a random walk in both phase and frequency. Therefore, the oscillator characterized by the above function has an instantaneous frequency random walk that, depending on phase noise PSD, can be measured and feedforward corrected when the correlation time of the frequency variation and random walk (i.e., the time in which the dominant instantaneous frequency can be considered almost stationary) is longer than the frequency estimator integration time.

In a phase-locked loop, in which a low quality oscillator (e.g., a phase-locked oscillator with no temperature control, generating at microwave frequencies) is constrained to follow a local, better-quality oscillator (such as a crystal one) oscillating normally up to tens or hundreds of MHz, the tracking loop bandwidth can be substantially increased as desired, since the estimation of the phase error is not affected by the communications link thermal noise, as it would be if the reference were coming from a remote location. The loop bandwidth increase is used to cause the constrained microwave oscillator to follow the phase noise of the crystal oscillator as much as possible in frequency.

Figure 14:
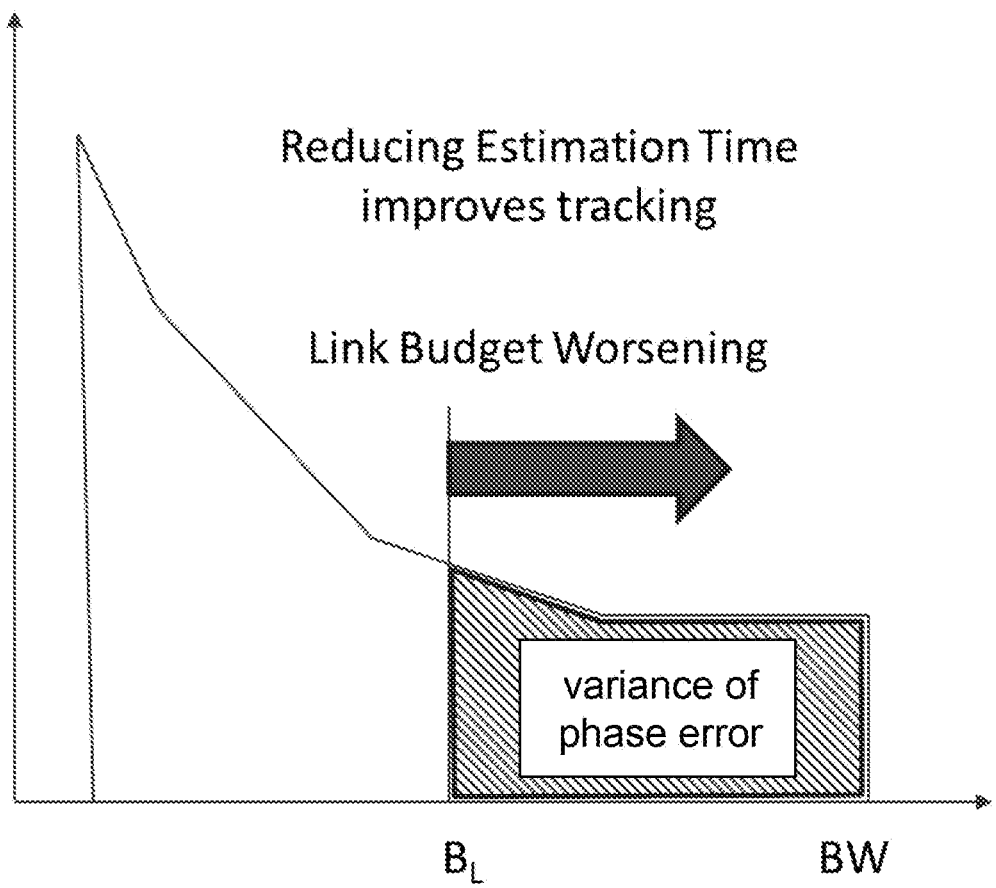
FIG. 14 is related to a typical computation of residual jitter of a clock reference.

FIG. 14 shows a typical computation of residual jitter of a clock reference, provided by the integral of part of the phase noise PSD (i.e., the zone in which the local oscillator does not follow the desired reference). The computation applies for both closed loop locking of two oscillators, and is valid also for open loop feedforward correction. In particular, FIG. 14 shows that increasing the loop bandwidth (or reducing the phase estimator integration time of a feedforward loop) improves disciplining (or feedforward correction) of the local oscillator. This is always true when the tracking or correction is local, hence executed at a high signal-to-noise ratio; but when disciplining is done to a remote clock, the increased loop bandwidth has the effect of allowing in the loop more thermal noise from the telecommunications link. On the other hand, in feedforward correction, reduced integration time reduces the energy captured from the estimator. The energy over the noise spectral density is the principal measure of any digital modulation or estimation, and it increases as a function of integration or symbol time. This is evident when reducing the symbol rate of a link for equal transmitted power and unmodified receiver noise figure.

As a matter of fact, when the reference comes from a remote location, as it is for the case of deep space reference tone and in the present invention, the trade-off among locking to the remote carrier up to high phase noise frequencies, to reduce the reciprocal jitter among the local and the remote oscillators, is in direct conflict with the need of narrowing the tracking loop (or estimator) bandwidth. Narrowing the tracking loop bandwidth is typically done in deep space carrier lock and tracking to allow lock even at signal-to-noise ratios as low as −150 dB (in this connection, reference can be made to L. Simone et al., "A novel digital platform for deep space transponders: the receiver side", 2004 IEEE Aerospace Conference Proceedings, 9-13 Mar. 2004").

The conclusion is that the local oscillator can be a very simple one, with no need of being controlled in temperature, since $\bar{f}_e$ can be easily estimated using a long integration time, but it is convenient that the local oscillator exhibits a phase noise with a well dominating center frequency and with long correlation time of the random walk, so that a long estimation window can be used (such as a 2 seconds correlation time, in which the frequency remains stable for the present application). This is in direct relation with the phase noise spectrum.

The fact of having a good local oscillator spectral purity and a long correlation time of the oscillator frequency random walk (e.g., at least a few seconds) allows also a quite accurate frequency estimation (even in the presence of thermal noise) of the order of close to a few Hertz of accuracy. In fact, any estimation made by the locator transponder 24 is affected, during its duration, by the local oscillator short-term frequency and phase variations.

Figure 15:
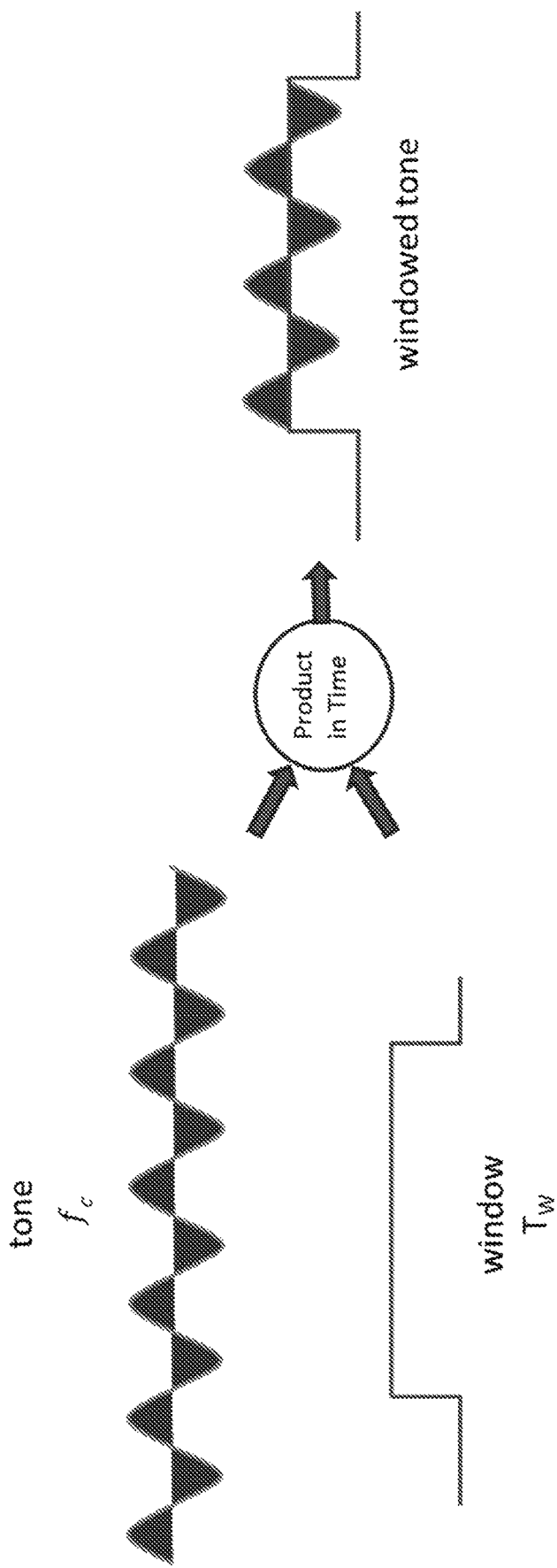
FIGS. 15 and 16 show that the use of a time window (i.e., a time-limited observation of a tone) results, in frequency domain, in a spectral smearing of the original tone spectral line.
Figure 16:
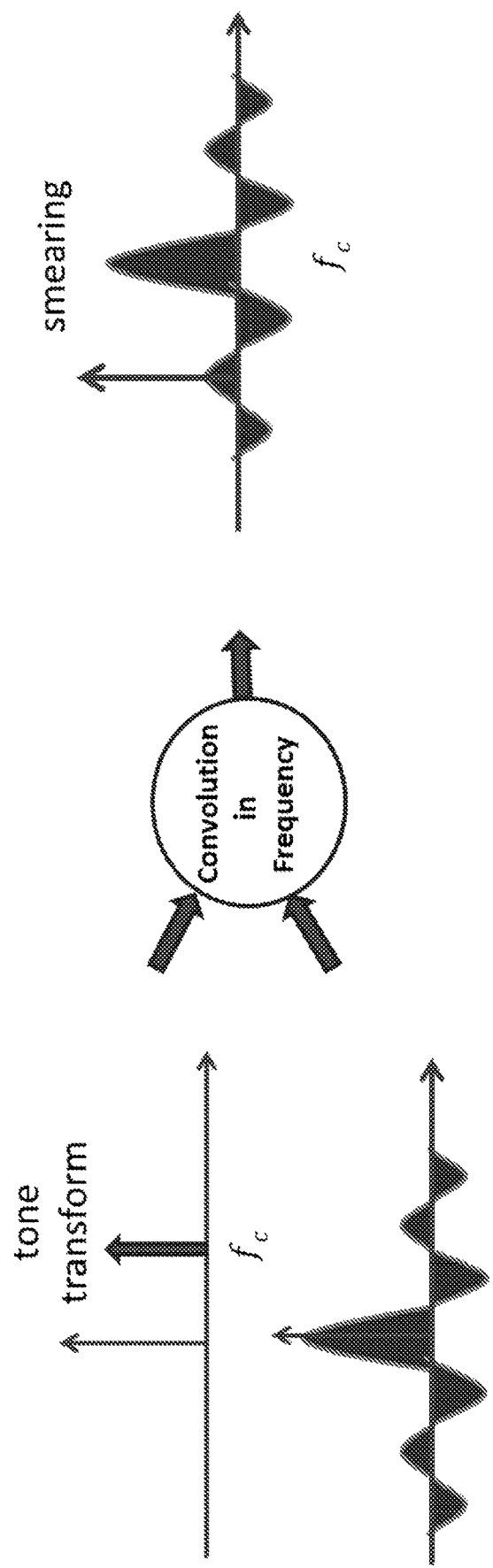

FIGS. 15 and 16 show one of the basic concepts of spectral estimation, whereby the use of a time window (i.e., a time-limited observation of a tone) results, in frequency domain, in a spectral smearing of the original tone spectral line.

Therefore, for link budget closure and for spectral (frequency) estimation accuracy and subsequent correction for uplink transmission of chirps, the estimation duration conveniently lasts at least more than one second.

8. PREFERRED, NON-LIMITING EMBODIMENTS FOR SPREAD SPECTRUM PAGING SIGNAL TRANSMISSION AND RECEPTION AND FOR FREQUENCY SYNCHRONIZATION

As is known, in deep space communications it is customary to decouple modulation noise from carrier synchronization, to have a double modulation scheme, using a subcarrier (in this connection, reference can be made to J. K. Holmes, "Coherent Spread Spectrum Systems", Wiley, 1982). In this connection, FIG. 17 schematically illustrates a typical modulation-demodulation scheme of the above type, including:
  at transmitter side 71, a subcarrier modulation (block 712) of binary data (block 711) based on a square wave subcarrier (block 713), then a phase modulation (block 714) based on a given carrier (block 715) and, finally, power amplification (block 716);
  at receiver side 72, coherent demodulation (block 721), subcarrier demodulation (block 722), bit synchronization (block 723) and, finally, data demodulation (block 724).

In other words, at the transmitter side 71, the binary data (block 711) modulates a subcarrier (blocks 712 and 713) and, once this is accomplished, the subcarrier modulated signal is phase modulated onto the real carrier (blocks 714 and 715), e.g., an X-band carrier.

This modulation-demodulation scheme may be conveniently used also for the paging step 31 and, hence, for the transmission by the radio communications system 22 and the reception by the transponder locator 24 of the spread spectrum paging signal.

Figure 18:
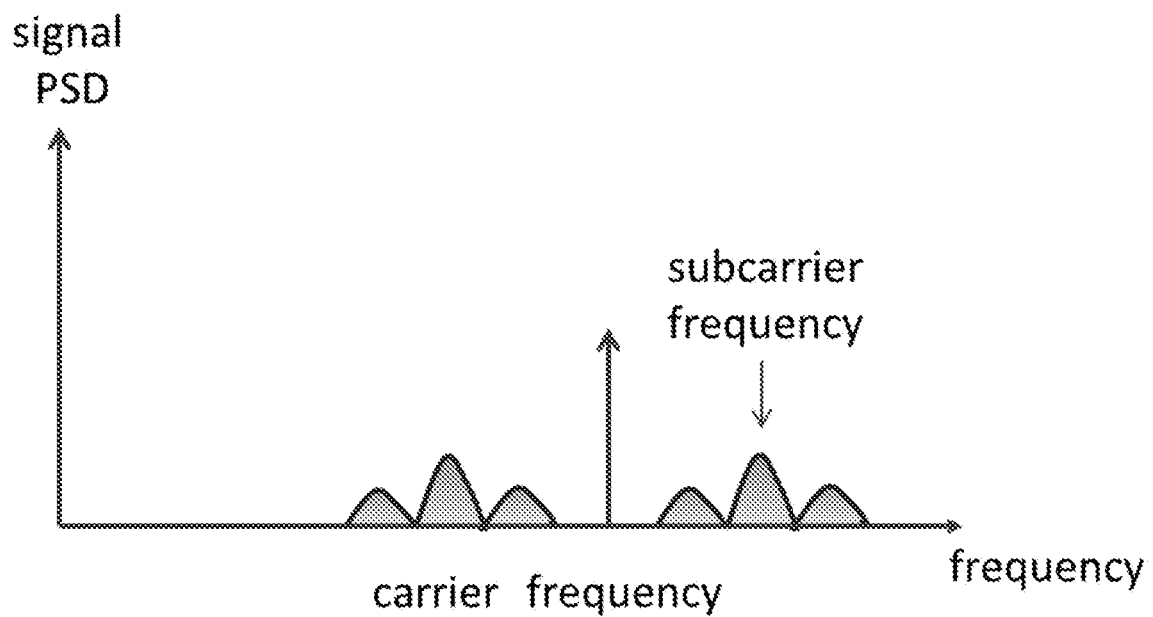
FIG. 18 shows an example of signal generated by using the modulation-demodulation scheme of FIG. 17.
Figure 17:
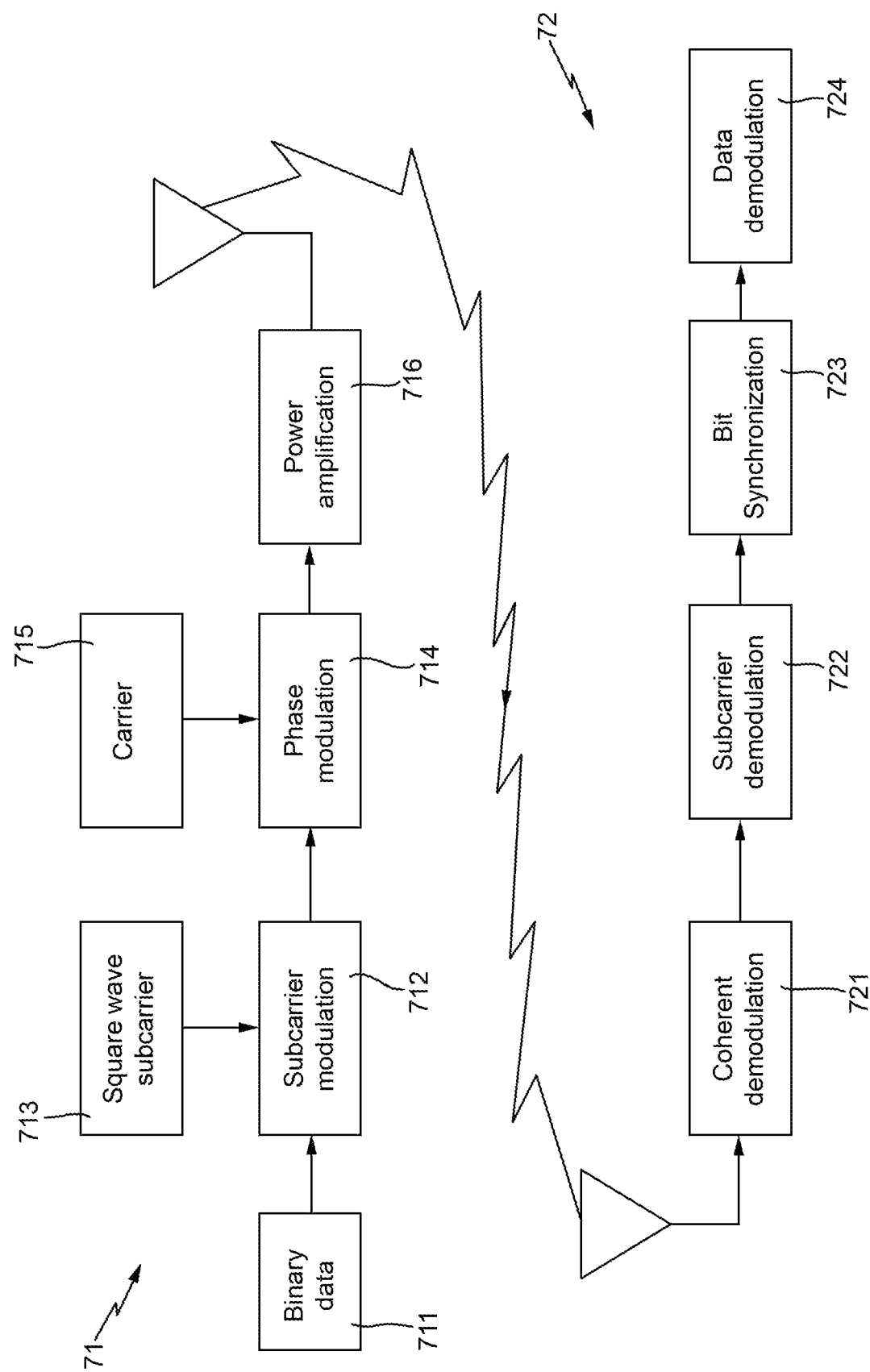
FIG. 17 schematically illustrates a typical modulation-demodulation scheme used for deep space communications and exploitable for transmission and reception of a spread spectrum paging signal according to a preferred, non-limiting embodiment of the present invention.

FIG. 18 shows an example of signal generated by using the modulation-demodulation scheme of FIG. 17. For some values of the modulation process parameters, a residual carrier is left, allowing a strong handle for synchronization and tracking.

FIG. 17 shows that the demodulation also follows a double demodulation process, first the carrier and then the subcarrier are demodulated. This allows a very simple demodulation process, in which a phase-locked loop (PLL), which may be analog or digital (the latter having the advantage of very narrow bandwidth implementation), is used to track the carrier with optimum choice of small bandwidth, to acquire signals down to a very low signal-to-noise ratio. At the same time, the modulation is placed away from the worst phase noise effects.

Conveniently, in the paging step 31, the binary data (block 711 in FIG. 17) that enter the subcarrier modulator (block 712 in FIG. 17) are preliminarily spread in a direct sequence spreading block, that uses a PN code with the result of building, essentially, a binary data stream with an increased data rate. In this case, the spectrum shown in FIG. 18 is broadened around the subcarrier frequency. This allows obtaining advantages when passing into a satellite telecommunications transponder.

Figure 19:
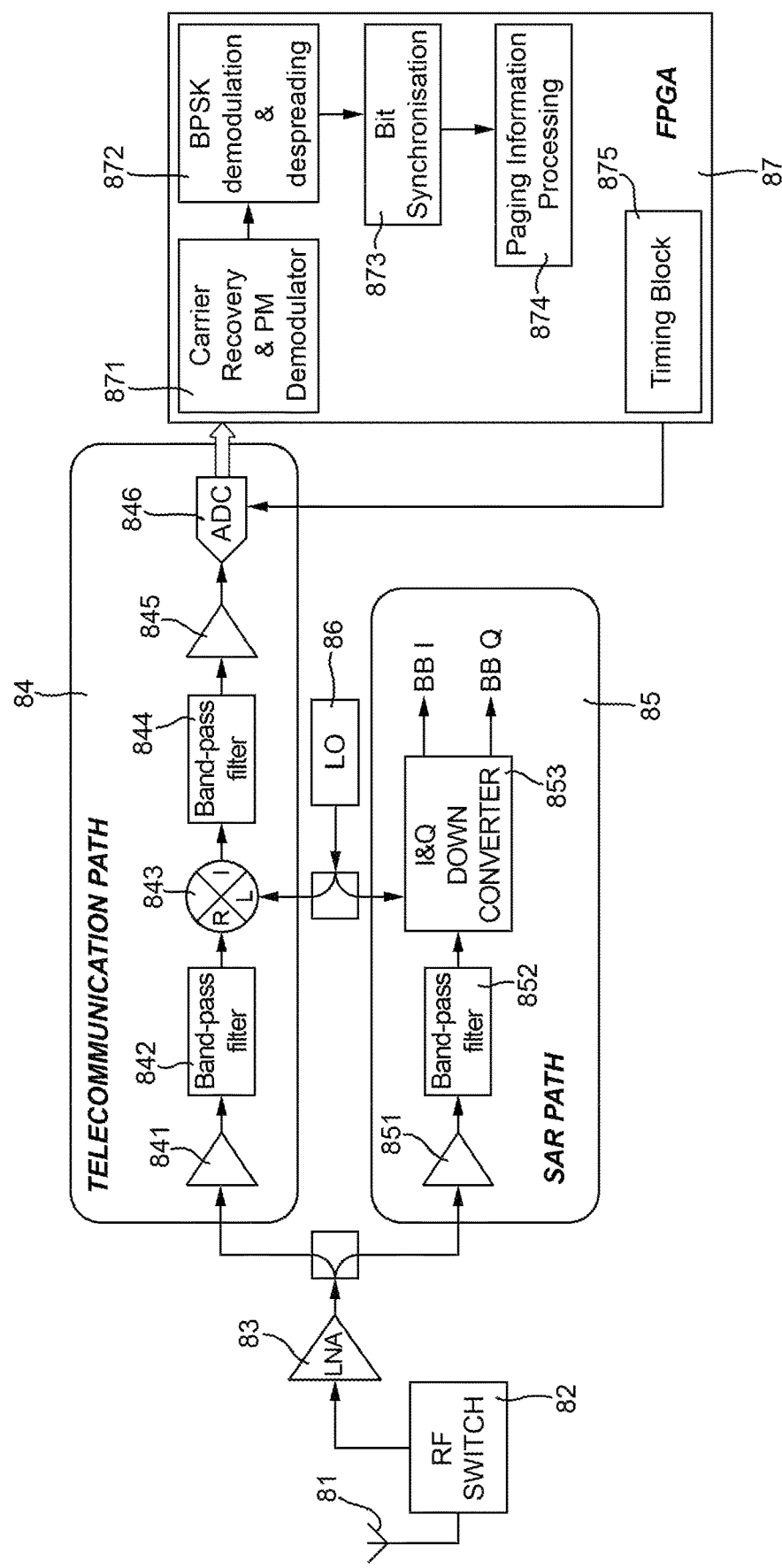
FIG. 19 schematically illustrates a non-limiting example of receiving section architecture for spread spectrum paging and radar signals reception by said locator transponder according to a preferred, non-limiting embodiment of the present invention.

FIG. 19 schematically illustrates a non-limiting example of receiving section architecture for spread spectrum paging and radar signals reception by the locator transponder 24 according to a preferred, non-limiting embodiment of the present invention.

In particular, as shown in FIG. 19, the locator transponder 24 conveniently includes:
- a patch antenna 81 for receiving the spread spectrum paging signal, the signaling-related signal(s) and the frequency-synchronization-aid signal(s) from the radio communications system 22 and the radar signals from the radar-based system 23, and for transmitting the watermarked radar echo signals;
- an RF switch 82 operable to alternately connect the patch antenna 81 to a receiving section (shown in FIG. 19) and a transmitting section (not shown in FIG. 19) of the locator transponder 24; and
- a Low Noise Amplifier (LNA) 83 alternately, or simultaneously, connectable to a telecommunication path 84 for the spread spectrum paging signal received from the radio communications system 22 and a SAR path 85 (conveniently assuming that the radar-based system 23 is a SAR system) for the radar signals received from the radar-based (conveniently, SAR) system 23.

Said telecommunication path 84 conveniently includes in cascade:
- a first amplifier 841;
- a first band-pass filter 842 for filtering out noise and image band signals;
- a first mixer 843 connected to a Local Oscillator (LO) 86 for frequency down-conversion (e.g., at Intermediate Frequency—IF) based on a reference frequency provided by said LO 86, so as to down-convert frequency to a manageable value for subsequent analog-to-digital conversion (block 846 in FIG. 19);
- a second band-pass filter 844;
- a second amplifier 845; and
- a first Analog-to-Digital Converter (ADC) 846.

Instead, said SAR path 85 conveniently includes in cascade:
- a third amplifier 851;
- a third band-pass filter 852 for filtering out noise and image band signals; and
- a down-converter 853, which is connected to the LO 86 to receive the reference frequency provided by said LO 86 and which is designed to output baseband (BB) in-phase (I) and quadrature (Q) components of the received radar signals.

Moreover, the locator transponder 24 conveniently includes also a Field-Programmable Gate Array (FPGA) 87, or an Application Specific Integrated Circuit (ASIC), that is connected to the first ADC 846 and is conveniently configured to:
- perform carrier recovery related to the received spread spectrum paging signal and implement a Phase Modulation (PM) demodulator (block 871 in FIG. 19);
- carry out BPSK demodulation and despreading (block 872 in FIG. 19);
- perform bit synchronization (block 873 in FIG. 19);
- carry out paging information processing (block 874 in FIG. 19) based on data and clock reference provided by the bit synchronization (block 873 in FIG. 19); and
- provide the first ADC 846 with a time (or clock) reference (block 875 in FIG. 19).

In other words, in use, the digital signal outputted by the first ADC 846 (that may be conveniently an IF undersampled signal) is fed to the PM demodulator (block 871 in FIG. 19) to recover modulating signal. Then, a further process of demodulation and despreading of the subcarrier is performed (block 872 in FIG. 19).

Figure 20:
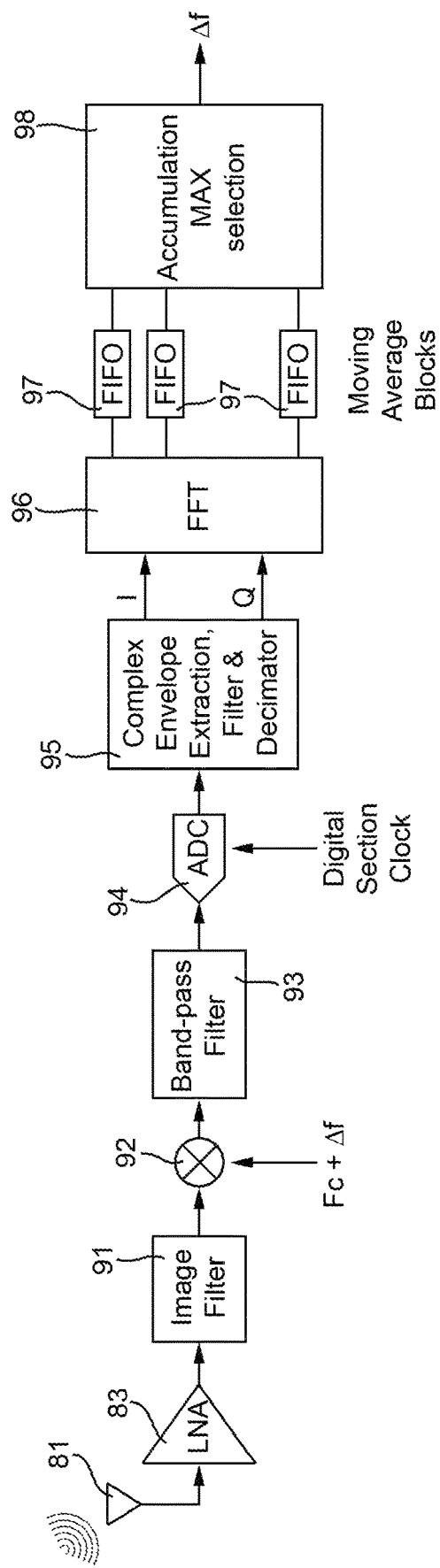
FIG. 20 schematically illustrates a non-limiting example of receiving section architecture for frequency-synchronization-aid signal reception by said locator transponder according to a preferred, non-limiting embodiment of the present invention.

Additionally, FIG. 20 schematically illustrates a non-limiting example of receiving section architecture for frequency-synchronization-aid signal reception by the locator transponder 24 according to a preferred, non-limiting embodiment of the present invention.

In particular, as shown in FIG. 20, the locator transponder 24 conveniently includes in cascade to said patch antenna 81 and LNA 83 also:
- an image filter 91 for removing noise from undesired bands;
- a second mixer 92 for performing frequency down-conversion (e.g., at IF) based on the reference frequency (in FIG. 20 denoted by Fc) provided by the LO 86 and an estimated frequency drift (in FIG. 20 denoted by $\Delta f$) affecting said reference frequency;
- a fourth band-pass filter 93 for anti-aliasing filtering; and
- a second ADC 94 that receives a clock reference from the LO 86.

The frequency-synchronization-aid signal receiving section shown in FIG. 20 and the telecommunication path 84 of FIG. 19 might conveniently share:
- one and the same band-pass filter for filtering out noise and image band signals (in place of, respectively, the first band-pass filter 842 and the image filter 91);
- one and the same mixer for frequency down-conversion (in place of, respectively, the first mixer 843 and the second mixer 92);
- one and the same band-pass filter in place of, respectively, the second band-pass filter 844 and the fourth band-pass filter 93; and
- one and the same ADC in place of, respectively, the first ADC 846 and the second ADC 94.

In other words, the telecommunication path 84 might conveniently be shared by both the spread spectrum paging signal receiving section and the frequency-synchronization-aid signal receiving section.

Moreover, as shown in FIG. 20, the digital signal outputted by the second ADC 94 is processed for complex envelope extraction (block 95 in FIG. 20) and, then, the frequency drift $\Delta f$ is estimated according to a predefined estimation algorithm, such as the frequency estimation algorithm disclosed in D. Rife and R. Boorstyn, "Single-tone parameter estimation from discrete-time observations", IEEE Transactions on Information Theory, vol. 20, no. 5, pp. 591-598, 1974, which includes: performing a Fast Fourier Transform (FFT—block 96 in FIG. 20), averaging FFT samples accumulated in First In First Out (FIFO) queues (blocks 97 in FIG. 20) and, after accumulation, searching for the maximum (block 98 in FIG. 20) representing a substantially optimum frequency drift estimate, with very low probability of being wrong (i.e., outlier probability).

In use, the frequency-synchronization-aid signal receiving section shown in FIG. 20 is activated once the locator transponder 24 has received the spread spectrum paging signal (in particular, once the spread spectrum paging signal receiving section shown in FIG. 19 has detected a spread spectrum paging signal carrying the permanent identification code assigned to said locator transponder 24).

Once activated, the frequency-synchronization-aid signal receiving section shown in FIG. 20 carries out an accurate estimation of the frequency drift Δf affecting the reference frequency Fc provided by the LO 86. Then, as previously explained, the locator transponder 24 "corrects" the reference frequency Fc provided by the LO 86 on the basis of the estimated frequency drift Δf thereby obtaining the transmission carrier frequency, so that said locator transponder 24 uses said transmission carrier frequency to transmit the watermarked radar echo signals.

The logic for deciding when (between times of reception of the spread spectrum paging signal and of the first radar signal) to activate the frequency-synchronization-aid signal receiving section shown in FIG. 20 may be conveniently defined by taking account of a trade-off among power consumption by the locator transponder 24, time for achieving the desired frequency synchronization accuracy by the frequency-synchronization-aid signal receiving section, and reaction time to switch in transmission mode by said locator transponder 24.

Furthermore, as for the residual carrier modulation scheme used, it is worth noting that it is possible, if/when additional gain is required/desired for the radio communications downlink budget (i.e., from the radio communications system 22 and the locator transponder 24), to use a slightly more complicated system in which also the residual carrier, used as synchronization aid, is spread to improve the downlink link budget and to reduce discrete lines in the spectrum. This solution may be conveniently carried out by simply adding spreading means in the transmitting section of the radio communications system 22 also for the modulation residual tone (and not only for the paging data modulation), and despreading and code synchronization means in the receiving section of the locator transponder 24, so that the reference unspread carrier is obtained.

Figure 21:
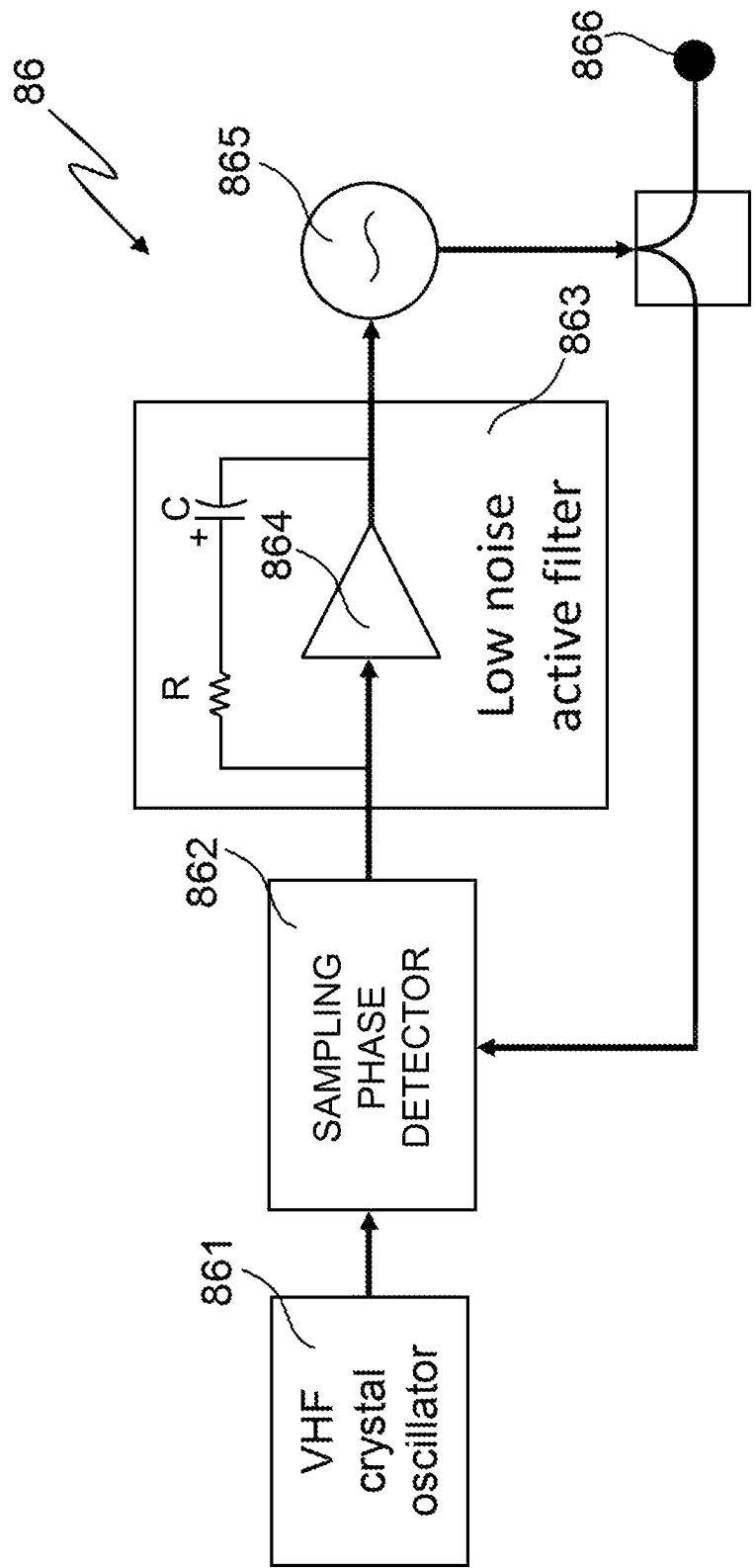
FIG. 21 schematically illustrates a non-limiting example of architecture for a local oscillator of said locator transponder according to a preferred, non-limiting embodiment of the present invention.

Finally, FIG. 21 schematically illustrates a non-limiting example of low power consumption, low-cost, phase-locked architecture for the LO 86 according to a preferred, non-limiting embodiment of the present invention.

In particular, as shown in FIG. 21, the LO 86 conveniently includes:

- a Very High Frequency (VHF) crystal oscillator 861 designed to provide a first reference signal having a first reference frequency in the VHF band;
- a sampling phase detector 862 coupled to the VHF crystal oscillator 861 to receive the first reference signal and configured to perform sampling phase detection;
- a low noise active filter 863 connected to the output of the sampling phase detector 862, wherein said low noise active filter 863 conveniently includes an amplifier 864 and a resistor R and a capacitor C connected between the input and the output of said amplifier 864; and
- a microwave oscillator 865 connected to the output of the low noise active filter 863 and designed to provide a second reference signal having a second reference frequency comprised in a microwave frequency band (e.g., in X band), wherein said second reference signal is provided
  - at an output 866 of the LO 86 so that it may be used by the locator transponder 24 as reference frequency signal for its operation in reception and in transmission (as previously described in detail), and
  - to the sampling phase detector 862 as closed-loop feedback.

9. REMARKS CONCERNING GAIN OF A SPREAD SPECTRUM SIGNAL TRANSMITTED VIA A TRANSPARENT SATELLITE TRANSPONDER

In view of the foregoing and, in particular, of what explained in the previous paragraph 8, the frequency synchronization may be performed with an incredibly low signal-to-noise ratio, whereas the subcarrier modulated signal is conveniently expanded in spectrum to endure very low signal-to-noise ratio of the radio communications downlink budget (i.e., from the radio communications system 22 and the locator transponder 24). The impact of spectrum expansion, while passing via a transparent satellite transponder, is explained hereinafter. In this connection, it is worth noting that, normally, a simple spectrum expansion via spread spectrum techniques does not provide gain with respect to the thermal noise.

In particular, in order to explain the reason for spreading the subcarrier modulated signal, the gain for a simpler signal is discussed hereinafter, without loss of generality.

Let's consider a random and uncorrelated data, as occurs with a coded source (with redundancy removal so that data correlation and non-equiprobability have been removed). If it is phase-modulated over a baseband signal with a raised-cosine spectrum, its Power Spectral Density (PSD) will be that of an Additive White Gaussian Noise (AWGN) passed through a raised-cosine filter. Using the concept of equivalent bandwidth, it is possible to find $B_{eq}$ via the following relationship:

$$\int_{fc-(1+\beta)Rs/2}^{fc-(1+\beta)Rs/2} PSD(f)df = PSD(fc)B_{eq}$$

and, for the above signal, using the frequency domain description of the raised cosine, it is possible to get:

$$B_{eq}=R_s.$$

Figure 22:
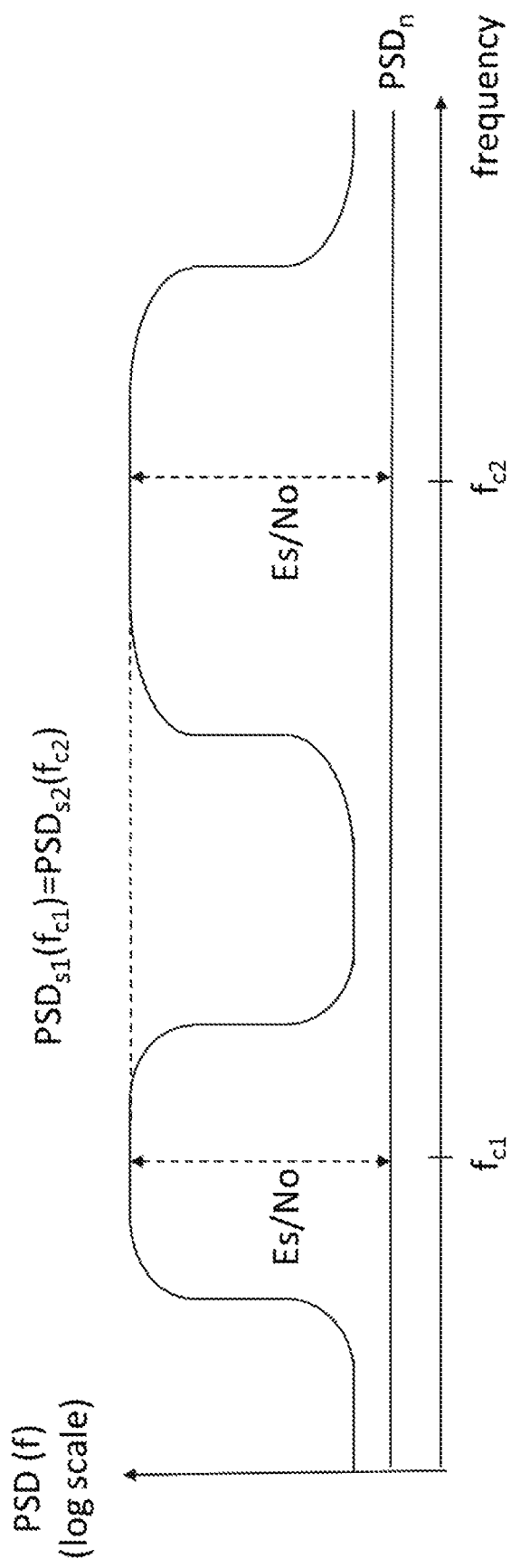
FIG. 22 is related to gain of a spread spectrum signal transmitted via a transparent satellite transponder, in which spread spectrum is used to provide high gain while avoiding severe unbalance between uplink and downlink signals.

Thence, it is easy to show that the signal $E_s$ is equal to the value of the PSD in the flat zone of the spectrum:

$$\frac{C}{B_{eq}} = PSD_{s1}\left[\frac{W}{Hz}\right] = \frac{C}{R_s} = CT_S \ [Ws] = E_{s1} \ [Ws] = E_{s1} \ [Joule]$$

and, in general, on a log scale PSD diagram, it is easy to measure the $E_s/N_0$ as the distance (difference) among the noise floor and the flat zone of the signal spectrum (in this connection, reference can be made, for example, to FIG. 22). This applies with negligible error when $E_s \gg N_0$, otherwise it is necessary to consider that within the signal PSD is present also the noise.

If a BPSK signal is assumed, it results:

$$\frac{E_s}{N_0} = \frac{E_b}{N_0}.$$

Now, let's consider a Direct Sequence Spread Spectrum (DSSS) signal. Normally, the fact of associating a power such that a certain $E_b/N_0$ is imposed is equivalent to transmit over the channel at a $E_c/N_0=E_b/MN_0$, where M is the spreading factor. That is $E_c=E_b/M$, since assuming using the energy $E_b$ for each bit and running the channel at a higher rate $R_c=MR_b$, less energy is devoted to transmission of a chip than to a bit.

Then, when despreading at the receiver, the energy of a chip is obtained by the processing gain M thereby obtaining $E_b=ME_c$. However, this is not the case if the signal is passed via a satellite transponder, where the signals shall enter the power amplifier with a minimum unbalance of power spectral density. In this case, the $E_s/N_0$ of two adjacent signals shall maintain the same $E_s/N_0$. It is easier to assume (as it is in the present case) that the downlink dominates the overall link budget and the impact of uplink noise is negligible. Obviously, at the ground station transmitter of a transparent satellite transponder, an enhanced $E_b$ has to be spent for the second signal than for the first one, and hence more power. But this is not an issue, since power at a ground station can be easily incremented, whereas the weak part of the overall link is, as mentioned, only the downlink.

Therefore, a signal with $R_c=2R_b$, assuming M=2, shall have the same $E_c/N_0$ as the $E_b/N_0$ of the unspread signal (in this connection, reference can be made again to FIG. 22). Since $R_c=2R_b$, a doubled carrier power is captured from the onboard amplifier overall power, to maintain the balance $E_c/N_0=E_b/N_0$ as shown in FIG. 22.

This time, at the receiver, the second signal, once despread, will have $E'_b/N_0=2E_c/N_0=2E_b/N_0$, in which $E'_b$ is the energy at the receiver.

10. CLOSING REMARKS

In view of the foregoing, technical advantages of the present invention are immediately clear to those skilled in the art.

In particular, it is worth noting that the present invention provides an innovative solution that allows locator transponders of the locator system according to WO 2018/162756 A1 to reliably and accurately perform frequency synchronization.

More specifically, the present invention allows using a low-cost, low power consumption, poorly accurate local oscillator (e.g., a non-temperature-controlled, phase-locked microwave oscillator with natively poor accuracy and stability), nevertheless avoiding degrading localization accuracy, avoiding imposing the use of an expensive and power-hungry local oscillator (such as an oven-controlled crystal oscillator) and avoiding requiring a search for transponder locators' signals within a wide frequency range.

In fact, as previously explained, the present invention provides a frequency synchronization solution allowing a dramatically reduced cost and power consumption of the locator transponders, with the best possible localization accuracy. This enables a really long lasting operation (i.e., a duration of many years) of extremely small-sized batteries and locator transponders.

Moreover, it is important to stress that an important advantage of the present invention is the use of regenerative locator transponders provided with the capability to achieve perfect carrier frequency synchronization, even beyond what would be possible with an oven-controlled oscillator, with no need of temperature control. The gained frequency accuracy, besides allowing maximizing localization accuracy, dramatically reduces the processing necessary at the localization processing center/station. This occurs since the dimension of the frequency domain to be processed at the localization processing center/station is reduced thanks to minimization of frequency uncertainty in the two-dimensional time-frequency search to be performed at the localization processing center/station, thereby reducing processing.

Additionally, the present invention provides also an innovative solution that allows locator transponders of the locator system according to WO 2018/162756 A1 to reliably and accurately perform also time synchronization.

Finally, it is worth noting that the use of a Finite State Machine (FSM) for carrying out the time synchronization (in particular, the FSM 61 shown in FIG. 11 and previously described in detail) is particularly advantageous in PRI-variable scenarios, such as SAR scenario.

The invention claimed is:

1. Localization method for locating a target that is coupled with a locator transponder (24) associated with a permanent identification code permanently assigned to said locator transponder (24); the localization method comprising:

a) upon reception of a user request for locating the target, transmitting, by a radio communications system (22), a spread spectrum paging signal carrying the permanent identification code and a temporary identification code temporarily assigned to the locator transponder (24), wherein said temporary identification code is shorter than said permanent identification code;

b) receiving, by the locator transponder (24), the spread spectrum paging signal and extracting, by said locator transponder (24), the temporary identification code carried by the received spread spectrum paging signal;

c) transmitting, by a radar-based system (23), radar signals towards one or more areas of earth's surface or sky and receiving, by said radar-based system (23), echo signals from said one or more areas of the earth's surface or sky;

d) upon reception by the locator transponder (24) of one or more radar signals transmitted by the radar-based system (23), generating and transmitting, by said locator transponder (24), a sequence of watermarked radar echo signals in which a spread spectrum watermarking signal is embedded, wherein said spread spectrum watermarking signal carries the temporary identification code extracted; and e) carrying out, by the radar-based system (23), localization operations that include:
detecting, in the received echo signals, the sequence of watermarked radar echo signals transmitted by the locator transponder (24),
extracting the temporary identification code carried by the spread spectrum watermarking signal embedded in the detected sequence of watermarked radar echo signals, and
determining a location of the locator transponder on the basis of the detected sequence of watermarked radar echo signals;

characterized by further comprising:

f) transmitting, by the radio communications system (22), one or more frequency-synchronization-aid signals;

g) receiving, by the locator transponder (24), the frequency-synchronization-aid signal(s) and estimating, by said locator transponder (24), based on the received frequency-synchronization-aid signal(s), a frequency drift affecting a reference frequency provided by a local oscillator (86) of said locator transponder (24);

wherein the locator transponder (24) transmits the sequence of watermarked radar echo signals by using a transmission carrier frequency obtained based on the reference frequency provided by the local oscillator (86) and on the estimated frequency drift.

2. The localization method of claim 1, further comprising:
h) transmitting, by the radio communications system (22), one or more signaling-related signals carrying signaling data indicating one or more operating parameters of the radar-based system (23);
i) receiving, by the locator transponder (24), the signaling-related signal(s) and extracting, by said locator transponder (24), the signaling data carried by the received signaling-related signal(s);
j) estimating, by the locator transponder (24), based on the radar signals received from the radar-based system (23) and on the extracted signaling data, timing parameters of the received radar signals;
wherein the locator transponder (24) transmits the sequence of watermarked radar echo signals by using the estimated timing parameters.

3. The localization method according to claim 1, wherein estimating the frequency drift includes carrying out:
a coarse frequency drift estimation based on the received spread spectrum paging signal; and
a fine frequency drift estimation based on the coarse frequency drift estimation and on the received frequency-synchronization-aid signal(s).

4. The localization method according to claim 1, wherein the radio communications system (22) is a satellite radio communications system (221); the localization method further comprising:
transmitting, from a ground station (25) to the satellite radio communications system (221), the frequency-synchronization-aid signal(s) to be transmitted by said satellite radio communications system (221);
receiving, by the ground station (25), the frequency-synchronization-aid signal(s) transmitted by the satellite radio communications system (221);
detecting, by the ground station (25), errors and/or shifts affecting the received frequency-synchronization-aid signal(s);
correcting, by the ground station (25), the received frequency-synchronization-aid signal(s) to compensate for the errors and/or shifts detected; and
retransmitting, by the ground station (25), the corrected frequency-synchronization-aid signal(s) to the satellite radio communications system (221) that retransmits said corrected frequency-synchronization-aid signal(s).

5. The localization method according to claim 1, wherein the radar-based system (23) is a synthetic aperture radar system or an inverse synthetic aperture radar system or a radar system.

6. The localization method according to claim 1, wherein the radio communications system (22) and the radar-based system (23) are installed both on board one or more same platforms.

7. Locator system (20) configured to carry out the localization method as claimed in claim 1, wherein said locator system (20) includes:
a radio communications system (22) configured to carry out the steps a) and f) of said localization method;
a radar-based system (23) configured to carry out the steps c) and e) of said localization method; and
a locator transponder (24) configured to carry out the steps b), d) and g) of said localization method.

8. The locator transponder (24) of claim 1 configured to carry out the steps b), d) and g) of the localization method as claimed in claim 1.

* * * * *